US012223867B2

(12) United States Patent
Ding et al.

(10) Patent No.: US 12,223,867 B2
(45) Date of Patent: Feb. 11, 2025

(54) DISPLAY PANEL, MOTHERBOARD AND MINI LED DISPLAY DEVICE

(71) Applicant: Shanghai Tianma Micro-Electronics Co., Ltd., Shanghai (CN)

(72) Inventors: Yimiao Ding, Shanghai (CN); Lihua Wang, Shanghai (CN); Zhenhai Yin, Shanghai (CN); Tingting Li, Shanghai (CN); Peng Gui, Shanghai (CN); Zhicheng Wu, Shanghai (CN); Qiongqin Mao, Shanghai (CN)

(73) Assignee: Shanghai Tianma Microelectronics Co., Ltd., Shanghai (CN)

( * ) Notice: Subject to any disclaimer, the term of this patent is extended or adjusted under 35 U.S.C. 154(b) by 180 days.

(21) Appl. No.: 18/299,514

(22) Filed: Apr. 12, 2023

(65) Prior Publication Data

US 2023/0316969 A1 Oct. 5, 2023

(30) Foreign Application Priority Data

Dec. 29, 2022 (CN) ......................... 202211709221.7

(51) Int. Cl.
*G09G 3/00* (2006.01)
*G09G 3/32* (2016.01)

(52) U.S. Cl.
CPC ............... *G09G 3/006* (2013.01); *G09G 3/32* (2013.01); *G09G 2310/0267* (2013.01);
(Continued)

(58) Field of Classification Search
CPC ........... G09G 3/00; G09G 3/006; G09G 3/20; G09G 3/22; G09G 3/30; G09G 3/32; G09G 2300/00; G09G 2300/04; G09G 2300/0421; G09G 2300/0426; G09G 2310/00; G09G 2310/02; G09G 2310/0264; G09G 2310/0267; G09G 2310/0275;
(Continued)

(56) References Cited

U.S. PATENT DOCUMENTS 10,823,570 B2 * 11/2020 Kanemoto ......... G01C 19/5747
11,176,856 B2 * 11/2021 Shin ..................... G09G 3/3688

FOREIGN PATENT DOCUMENTS

CN 109003566 A 12/2018
CN 109727972 A 5/2019
(Continued)

*Primary Examiner* — Hoai-An D. Nguyen
(74) *Attorney, Agent, or Firm* — CHRISTENSEN O'CONNOR JOHNSON KINDNESS PLLC

(57) ABSTRACT

A display panel, a motherboard, and a mini LED display device. The display panel includes: a panel edge extending along a first direction, and a display region and a test region. The test region is between the display region and the panel edge and includes test pads. At least two test pads are arranged along the first direction, adjacent ones of which are spaced by at least two first electrostatic discharge protection wires extending from one side of the display region adjacent to the test region to the panel edge. Each first electrostatic discharge protection wire includes a first line segment located between two adjacent test pads and a second line segment adjacent to the panel edge. A distance between adjacent first line segments between two adjacent test pads in the first direction is less than a distance between adjacent second line segments in the first direction.

20 Claims, 31 Drawing Sheets

(52) U.S. Cl.
CPC .............. *G09G 2310/0275* (2013.01); *G09G 2330/06* (2013.01); *G09G 2330/12* (2013.01)

(58) Field of Classification Search
CPC ........... G09G 2330/00; G09G 2330/06; G09G 2330/12; G09F 9/00; G09F 9/30; G09F 9/33; H01L 22/00; H01L 22/30; H01L 22/32; H01L 23/00; H01L 23/58; H01L 23/60; H01L 33/00; H01L 33/005
USPC .................................................. 324/500, 537
See application file for complete search history.

(56) References Cited

FOREIGN PATENT DOCUMENTS

| | | | | | |
|---|---|---|---|---|---|
| CN | 110752295 A | * | 2/2020 | ......... | H01L 27/3244 |
| CN | 110930915 A | * | 3/2020 | ............... | G09F 9/00 |
| CN | 109786363 B | * | 9/2020 | ........... | H01L 23/544 |

* cited by examiner

DISPLAY PANEL, MOTHERBOARD AND MINI LED DISPLAY DEVICE

CROSS-REFERENCE TO RELATED DISCLOSURE

The present disclosure claims priority to Chinese Patent Disclosure No. 202211709221.7, filed on Dec. 29, 2022, the content of which is incorporated herein by reference in its entirety.

TECHNICAL FIELD

The present disclosure relates to the technical field of display, and in particular, to a display panel, a motherboard, and a mini LED display device.

BACKGROUND

In a manufacturing process of a display panel, in order to save costs and prevent waste of materials, after a motherboard is cut to form to-be-tested display panels, the to-be-tested display panel is detected to determine whether the to-be-tested display panel can emit light normally, and then is bonded to a driver chip or a printed circuit board.

To this end, the to-be-tested display panel is provided with test pads. However, the test pads occupy a large space in a lower bezel and are densely arranged with other wires, thereby leading to undesirable problems such as short circuit during testing.

SUMMARY

In view of the above, some embodiments of the present disclosure provide a display panel and a manufacturing method thereof, a motherboard, and a mini LED display device.

In an aspect, some embodiments of the present disclosure provide a display panel including: a panel edge extending along a first direction, and a display region and a test region arranged along a second direction intersecting the first direction.

The test region is located between the display region and the panel edge and includes a plurality of test pads. At least two test pads of the plurality of test pads are arranged along the first direction. At least two test pads adjacent in the first direction are spaced apart by multiple first electrostatic discharge protection wires. The first electrostatic discharge protection wires extend from one side of the display region adjacent to the test region to the panel edge.

Each first electrostatic discharge protection wire includes a first line segment and a second line segment, the first line segment is located between two adjacent test pads, and the second line segment is adjacent to the panel edge. A distance between adjacent first line segments that are located between two adjacent test pads in the first direction is less than a distance between adjacent second line segments in the first direction.

In another aspect, some embodiments of the present disclosure provide a motherboard including a plurality of panel regions. Each of the plurality of panel regions corresponds to a to-be-tested display panel. The panel region includes: a first edge extending along a first direction, and a display region and a test region arranged along a second direction intersecting the first direction.

The test region is located between the display region and the first edge and includes a plurality of test pads. At least two test pads of the plurality of test pads are arranged along the first direction. At least two test pads adjacent in the first direction are spaced apart by multiple first electrostatic discharge protection wires. The first electrostatic discharge protection wires extend from one side of the display region adjacent to the test region to the first edge.

Each first electrostatic discharge protection wire includes a first line segment and a second line segment, the first line segment is located between two adjacent test pads, and the second line segment is connected to the first line segment. A distance between adjacent first line segments that are located between two adjacent test pads in the first direction is less than a distance between adjacent second line segments in the first direction.

In yet another aspect, some embodiments of the present disclosure provide a method for manufacturing a display panel, including the following steps:

forming a motherboard, cutting the motherboard to form a plurality of independent to-be-tested display panels, applying a test voltage to a test pad of the plurality of test pads in each to-be-tested display panel to test the to-be-tested display panel, and forming the display panels using the to-be-tested display panels.

In still another aspect, some embodiments of the present disclosure further provide a display panel, manufactured by the above method for manufacturing a display panel.

In a further aspect, some embodiments of the present disclosure further provide a mini LED display device, including the above display panel.

BRIEF DESCRIPTION OF DRAWINGS

In order to more clearly illustrate the technical solutions in the embodiments of the present disclosure, the accompanying drawings used in the description of the embodiments will be briefly introduced below. It is apparent that the accompanying drawings in the following description are only some embodiments of the present disclosure, and other drawings can be obtained by those of ordinary skill in the art from the provided drawings without creative efforts.

DESCRIPTION OF EMBODIMENTS

In order to better understand the technical solutions of the present disclosure, the embodiments of the present disclosure will be described in detail below with reference to the accompanying drawings.

It should be made clear that the described embodiments are merely some of rather than all of the embodiments of the present disclosure. All other embodiments acquired by those of ordinary skill in the art without creative efforts based on the embodiments in the present disclosure fall within the protection scope of the present disclosure.

The terms used in the embodiments of the present disclosure are for the purpose of describing particular embodiments only and are not intended to limit the present disclosure. As used in the embodiments of the present disclosure and the appended claims, the singular forms of "a/an", "the", and "said" are intended to include plural forms, unless otherwise clearly specified in the context.

It should be understood that the term "and/or" used herein is merely an association relationship describing associated objects, indicating that three relationships may exist. For example, A and/or B indicates that there are three cases of A alone, A and B together, and B alone. In addition, the character "/" herein generally means that associated objects before and after it are in an "or" relationship.

A process of manufacturing a display panel 100 is described first in the present disclosure for providing a clearer understanding of structures such as a panel edge 1 and first electrostatic discharge protection wires 5 in the display panel 100.

Figure 19:
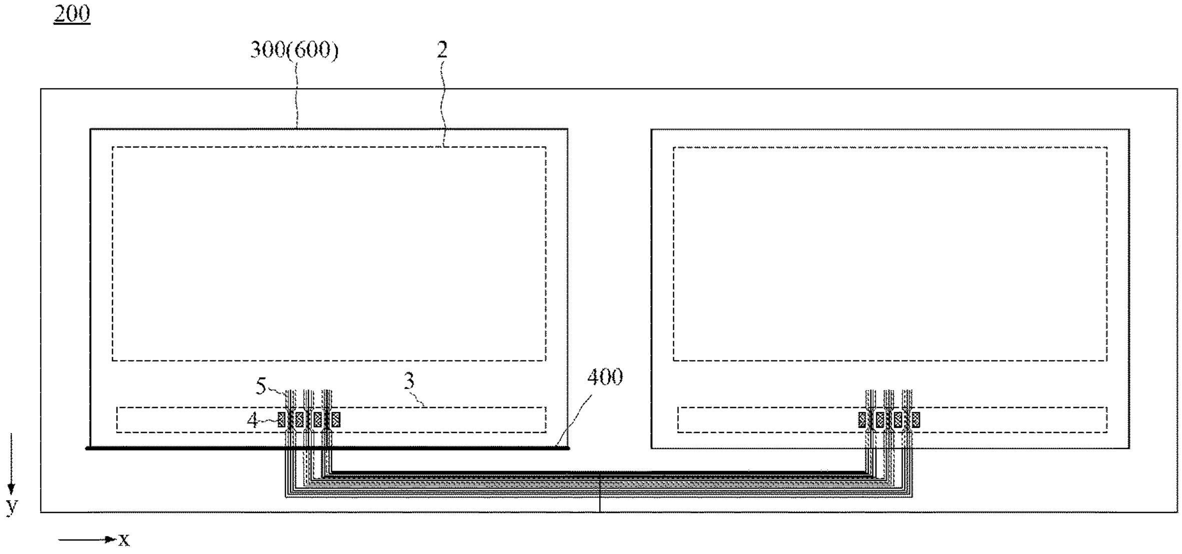
FIG. 19 is a schematic structural diagram of a motherboard according to some embodiments of the present disclosure.

Generally, the display panel is obtained by cutting a motherboard. Referring to FIG. 19, a motherboard 200 according to some embodiments of the present disclosure includes a plurality of panel regions 300. Each panel region 300 corresponds to a to-be-tested display panel 600. The panel region 300 includes structures such as test pads 4.

Referring to FIGS. 37A-37D and 38A-38C, in a process of cutting the motherboard 200 into the display panels 100, firstly, the motherboard 200 is cut along cutting lines 500 to form a plurality of independent to-be-tested display panels 600. The cutting lines 500 include a first cutting line 501. Edges of the to-be-tested display panels 600 formed by cutting the motherboard 200 along the first cutting line 501 are first edges 400. Then, each of the to-be-tested display panels 600 is tested. During the testing, test voltages are applied to the test pads 4 in the to-be-tested display panel 600, the test voltages are transferred to various signal lines to control the to-be-tested display panel 600 to display a test pattern, and then it is determined according to the displayed test pattern whether display performance of the to-be-tested display panel 600 is normal. For preventing material waste, the defective display panel 600 that cannot display normally will not be bonded to a driver chip or a printed circuit board. After the testing of the to-be-tested display panels 600, the to-be-tested display panels 600 are utilized to form the display panel.

It is to be noted that, when the display panel is a mini LED display panel, after the motherboard 200 is cut to form the plurality of independent to-be-tested display panels 600, a transfer process (such as surface mounting) is further required to place mini LEDs on the to-be-tested display panels 600, and then the to-be-tested display panels 600 are tested.

For the process of forming the display panel by the to-be-tested display panel 600, some embodiments of the present disclosure provide two feasible methods.

In the first feasible method, referring to FIG. 37A-37D, the to-be-tested display panel 600 is not cut, connections between the test pads 4 and various signal lines in the to-be-tested display panel 600 are directly cut off (fractures are formed in connection lines 11 between the test pads 4 and pins 9). That means, by this method, a structure where the test pads 4 are located is kept in the final display panel 100, and thus the display panel 100 includes the test pads 4.

Figure 38A:
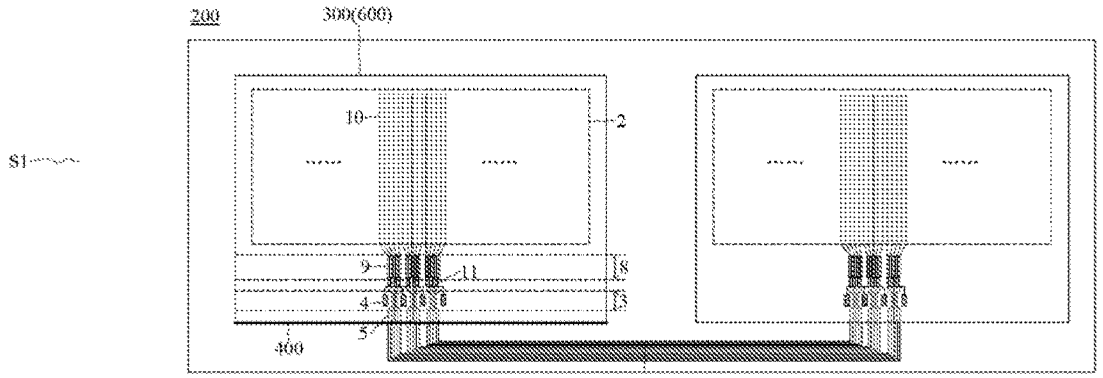
FIGS. 38A-38C are structural flowcharts of the method for manufacturing a display panel according to some embodiments of the present disclosure.
Figure 38B:
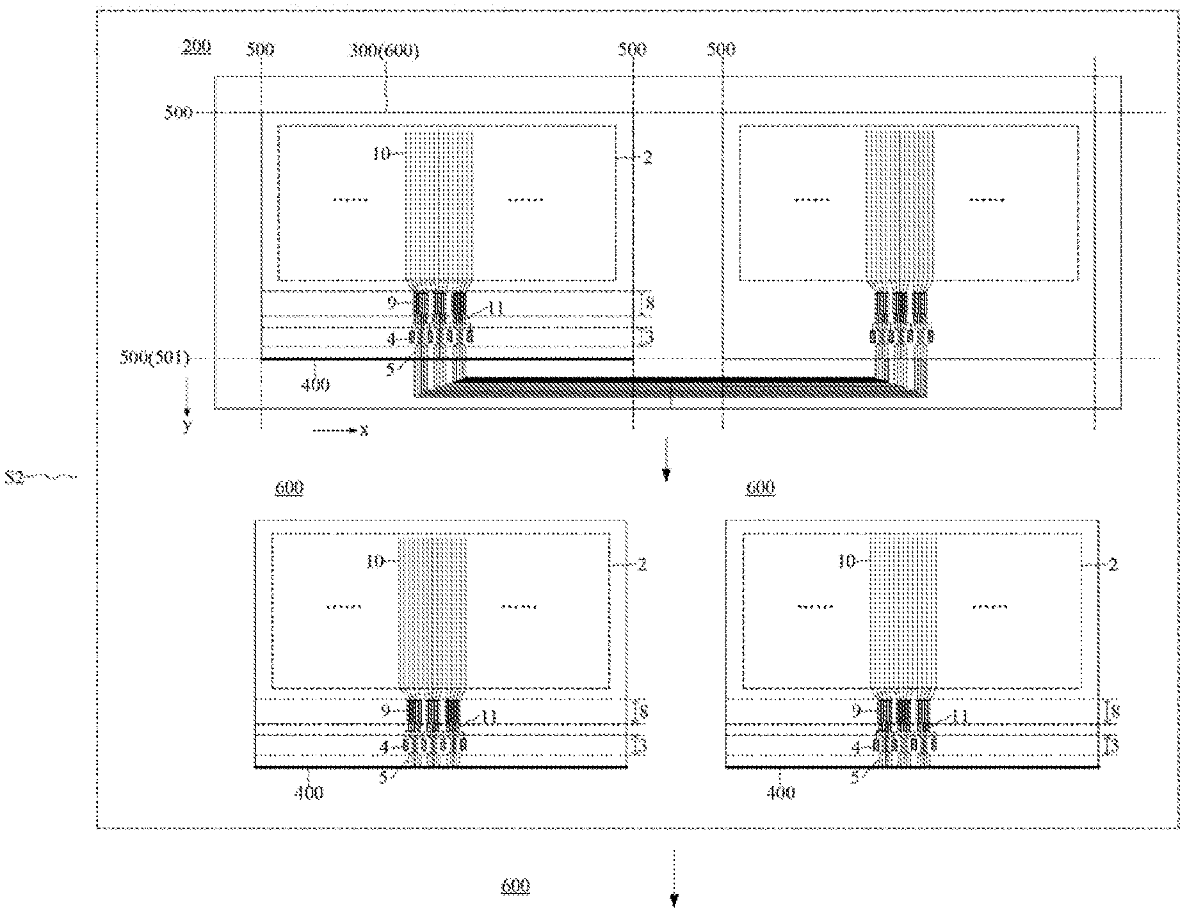
Figure 38C:
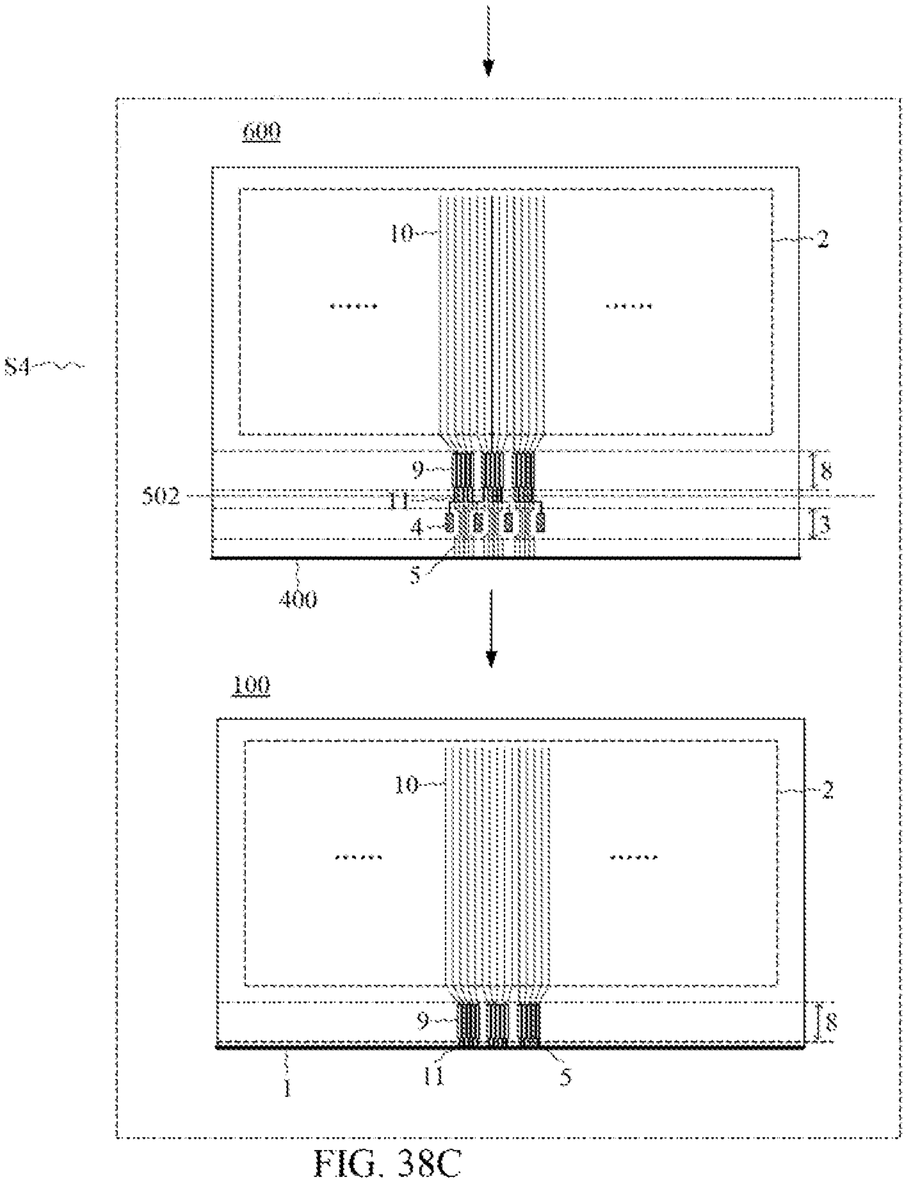

In the second feasible method, referring to FIGS. 38A-38C, the to-be-tested display panel 600 is further cut along a second cutting line 502. In the method, the structure where the test pads 4 are located is cut away, so the final display panel 100 includes no test pads 4.

In addition, referring to FIG. 19, each of the panel regions 300 of the motherboard 200 is further provided with a plurality of first electrostatic discharge protection wires 5. At least one first electrostatic discharge protection wire 5 of the first electrostatic discharge protection wires 5 extends between two adjacent test pads 4. The first electrostatic discharge protection wires 5 in each panel region 300 further extend to the outside of the panel region 300 and are connected together, and then are connected to an outer edge of the motherboard 200 through a lead wire, thereby discharging static electricity generated in the manufacturing process of the motherboard 200 to the outside of the motherboard 200 and providing electrostatic discharge protection for the motherboard 200. When the motherboard 200 is cut to form the to-be-tested display panels 600, the first electrostatic discharge protection wires 5 are cut off at the first edges 400 of the to-be-tested display panels 600. During the testing of the to-be-tested display panels 600, the first electrostatic discharge protection wires 5 may still discharge the static electricity to the outside of the to-be-tested display panels 600 to prevent breakdown of circuits in the to-be-tested display panels 600 by the static electricity, thereby also providing electrostatic discharge protection for the to-be-tested display panels 600.

Based on this, some embodiments of the present disclosure provide a display panel 100. The display panel 100 may be formed with the above first feasible method. That means, the structure where the test pads 4 are located is kept in the display panel 100.

Figure 1:
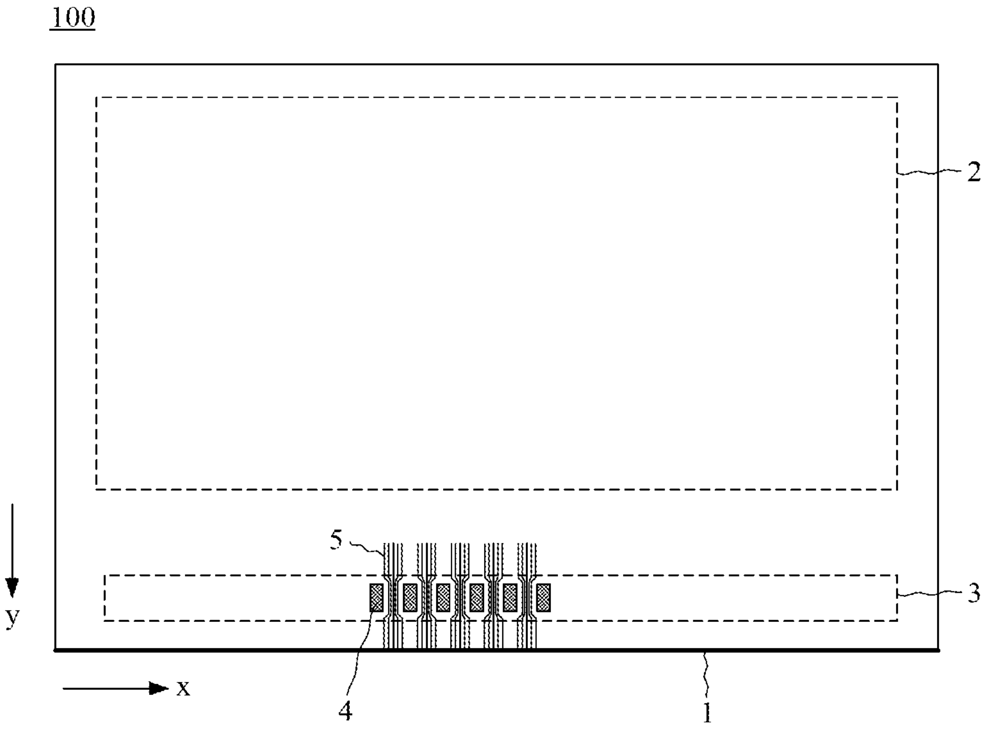
FIG. 1 is a schematic structural diagram of a display panel according to some embodiments of the present disclosure.
Figure 2:
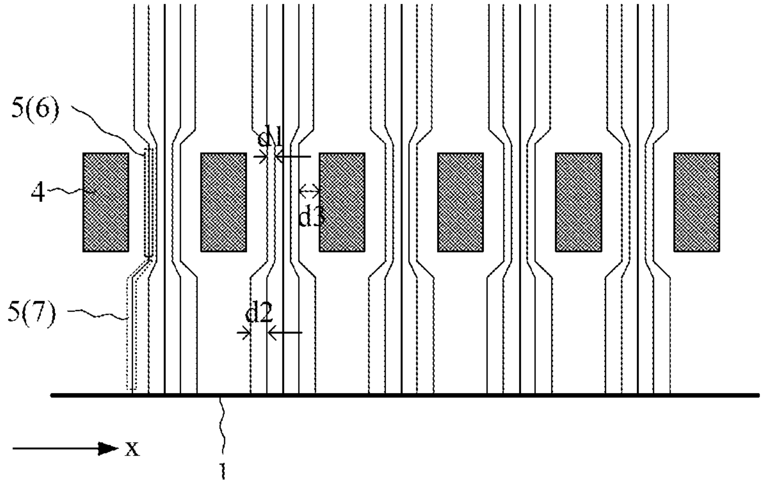
FIG. 2 is a schematic diagram of a layout of test pads and first electrostatic discharge protection wires according to some embodiments of the present disclosure.

FIG. 1 is a schematic structural diagram of a display panel 100 according to some embodiments of the present disclosure, and FIG. 2 is a schematic diagram of arrangement of test pads 4 and first electrostatic discharge protection wires 5 according to some embodiments of the present disclosure. As shown in FIG. 1 and FIG. 2, the display panel 100 includes a panel edge 1 extending along a first direction x, and a display region 2 and a test region 3 arranged along a second direction y. The test region 3 is located between the display region 2 and the panel edge 1. The first direction x intersects the second direction y. The panel edge 1 coincides with the first edge 400 of the to-be-tested display panel 600. The panel edge 1 is formed by cutting the motherboard 200 along a first cutting line 501.

The test region 3 includes a plurality of test pads 4, at least part of the test pads 4 are arranged along the first direction x, and at least two of the test pads 4 adjacent in the first direction x are spaced apart by first electrostatic discharge protection wires 5. The first electrostatic discharge protection wires 5 extend from one side of the display region 2 close to the test region 3 to the panel edge 1. With reference to the above description of the manufacturing process of the display panel 100, it can be seen that when the motherboard 200 is cut along the first cutting line 501 to form the to-be-tested display panels 600, the first electrostatic discharge protection wires 5 are cut off at the first cutting line 501 (i.e. the panel edge 1). Therefore, when the to-be-tested display panel 600 is further processed to form the display panel 100 by using the first feasible method, the first electrostatic discharge protection wires 5 extend from the side of the display region 2 close to the test region 3 to the panel edge 1 in the display panel 100.

Referring to FIG. 2, the first electrostatic discharge protection wire 5 includes a first line segment 6 and a second line segment 7, the first line segment 6 is located between two adjacent test pads 4, and the second line segment 7 is adjacent to the panel edge 1. Moreover, adjacent first line segments 6 between two adjacent test pads 4 are spaced by a distance d1 in the first direction x, adjacent second line segments 7 are spaced by a distance d2 in the first direction x, and the distance d1 is less than the distance d2.

In some embodiments of the present disclosure, in the design of the first electrostatic discharge protection wires 5, the distance between the second line segments 7 that are close to the panel edge 1 is set to a larger value. Accordingly, when the motherboard 200 is cut along the first cutting line 501 to form the to-be-tested display panels 600, even if the metal particle generated by cutting falls between the adjacent second line segments 7, it is difficult for the metal particle to contact the two second line segments 7 at the same time, thereby preventing short circuit of the adjacent second line segments 7. In this way, the second line segments 7 are independent of each other in the to-be-tested display panels 600 formed by cutting the motherboard 200. In some embodiments, when the first electrostatic discharge protection wires 5 are connected to the pins, short circuit between the pins caused by the short circuit of the second line segments 7 can be prevented, and then false detection caused by a signal transmission error can be prevented during the testing of the to-be-tested display panels 600.

At the same time, the distance d1 between adjacent first line segments 6 is designed to be smaller, that is, the first line segments 6 are densely arranged, which can reduce a total width required for arranging the first line segments 6 in the first direction x. When the distance between two adjacent test pads 4 is fixed, the distance d3 between the first line segments 6 and the test pad 4 is increased to space the first line segments 6 farther from the test pads 4. In this way, during the testing of the to-be-tested display panels 600, when the test voltage is applied to the test pad 4 by using a probe, the probe is prevented from being in contact with or near the first line segments 6, thereby preventing short circuit between the test pads 4 and the first line segments 6 and between two adjacent first line segments 6. In some embodiments, when the first electrostatic discharge protection wires 5 are connected to the pins, short circuit between the pins caused by the short circuit between the test pads 4 and the first line segments 6 and the short circuit between two adjacent first line segments 6 can be prevented, and then false detection caused by a signal transmission error can be further prevented during the testing of the to-be-tested display panels 600.

In addition, when a large number of test pads 4 are arranged in the display panel 100 and the first line segments 6 are densely arranged, two adjacent test pads 4 can also be arranged closer with ensuring a sufficient spacing distance between the first line segments 6 and the test pads 4, thereby reducing a total width required for arranging the test pads 4 in the first direction x and optimizing the arrangement of the test pads 4 on a lower bezel. In other words, a total space occupied by the test pads 4 on the lower bezel can be reduced, helping to optimize the design of a narrow bezel of the display panel 100.

In some embodiments, referring to FIG. 2 again, the distance d3 between the test pad 4 and the first line segment 6 adjacent thereto in the first direction x is greater than the distance d1 between adjacent first line segments 6 that are arranged between two adjacent test pads 4 in the first direction x, to ensure a sufficient distance between the test pad 4 and the first line segment 6 closest thereto, thereby preventing scratches of the probe on the first line segments 6 during the testing.

It is to be noted that, in practical applications, the value of the distance d1 between the adjacent first line segments 6 in the first direction x, the value of the distance d2 between the adjacent second line segments 7 in the first direction x, and the value of the distance d3 between the test pad 4 and the first line segment 6 adjacent thereto in the first direction x can be adjusted according to design parameters such as a designed distance between two adjacent test pads 4 in the display panel, a designed number of the first electrostatic discharge protection wires 5 between two adjacent test pads 4, and a designed line width of the first electrostatic discharge protection wires 5.

For example, when the designed distance between two adjacent test pads 4 is larger and the number of first electrostatic discharge protection wires 5 between two adjacent test pads 4 is smaller, the values of d1, d2, and d3 may be designed to be larger. However, if the designed distance between two adjacent test pads 4 is smaller and the number of first electrostatic discharge protection wires 5 between two adjacent test pads 4 is larger, the values of d1, d2, and d3 may be designed to be smaller with preventing the foregoing short circuit. That is, the specific values of d1, d2, and d3 may be adaptively adjusted according to different display panel structures. The values of d1, d2, and d3 are not limited in the embodiments of the present disclosure.

Figure 3:
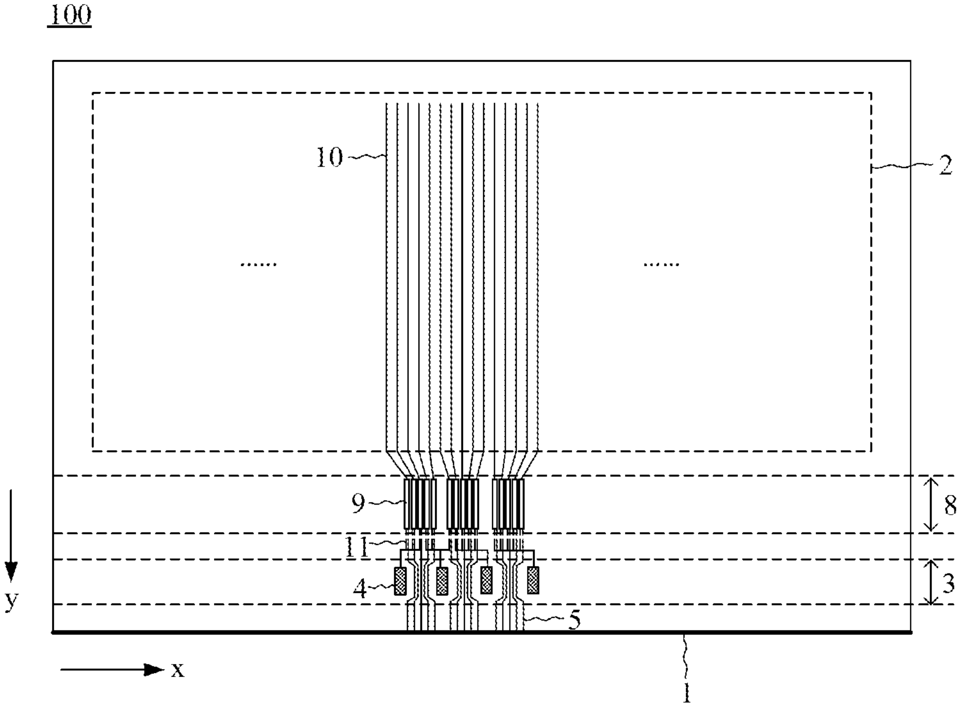
FIG. 3 is another schematic structural diagram of the display panel according to some embodiments of the present disclosure.
Figure 4:
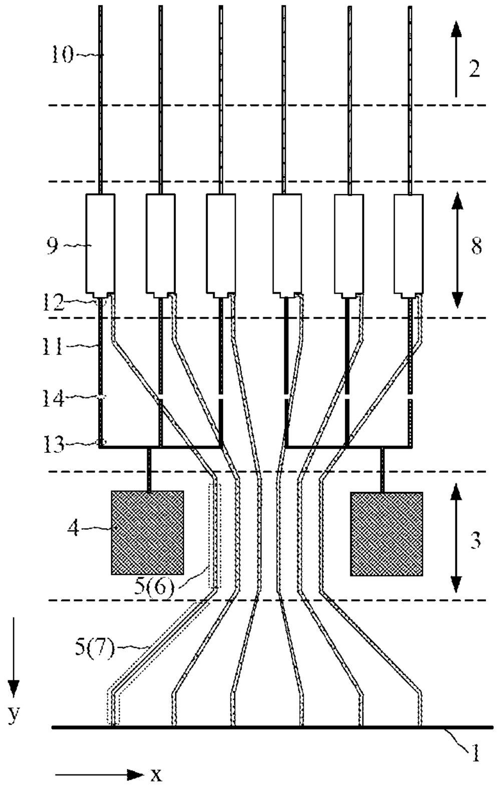
FIG. 4 is a schematic diagram of connections of pins according to some embodiments of the present disclosure.

In one or more feasible embodiments, as shown in FIG. 3 which is another schematic structural diagram of the display panel 100 and FIG. 4 which is a schematic diagram of connections of pins 9, the display panel 100 further includes a bonding region 8 between the display region 2 and the test region 3, and the bonding region 8 includes a plurality of pins 9. The display panel 100 is bonded to a driver chip or a printed circuit board through the pins 9. At least part of the pins 9 each include a first end connected to a driving signal line 10 and a second end connected to a first end 12 of a connection line 11, and a second end 13 of the connection line 11 is connected to the test pad 4. The connection line 11 includes a fracture 14 between the first end 12 and the second end 13 and is disconnected at the fracture 14.

It is to be noted that, referring to FIG. 19 and FIGS. 37A-37D, the fracture 14 does not exist in the connection lines 11 in the motherboard 200 and the connection lines 11 in the to-be-tested display panels 600 formed by cutting the motherboard 200. In the to-be-tested display panel 600, a connection relationship exists among the driving signal lines 10, the pins 9, the connection lines 11, and the test pads 4. In this way, when a test voltage is applied to the test pad 4, the test voltage can be transferred to the driving signal line 10 through the connection line 11 and the pin 9, and then drive the display panel 100 to display a test pattern.

However, after the testing of the to-be-tested display panel 600, the fractures 14 can be formed in the connection lines 11 by cutting to make the test pads 4 and the pins 9 disconnected when forming the display panel 100 by the to-be-tested display panel 600. In this way, the display panel 100 is formed, the test pads 4 and the driving signal lines 10 are disconnected, which can improve reliability of display. In some embodiments of the present disclosure, the connection lines 11 may be cut by using a laser trimmer process, which reduces a risk of static electricity, is not prone to generate metal particles, and prevents short circuit between adjacent wires.

Figure 5:
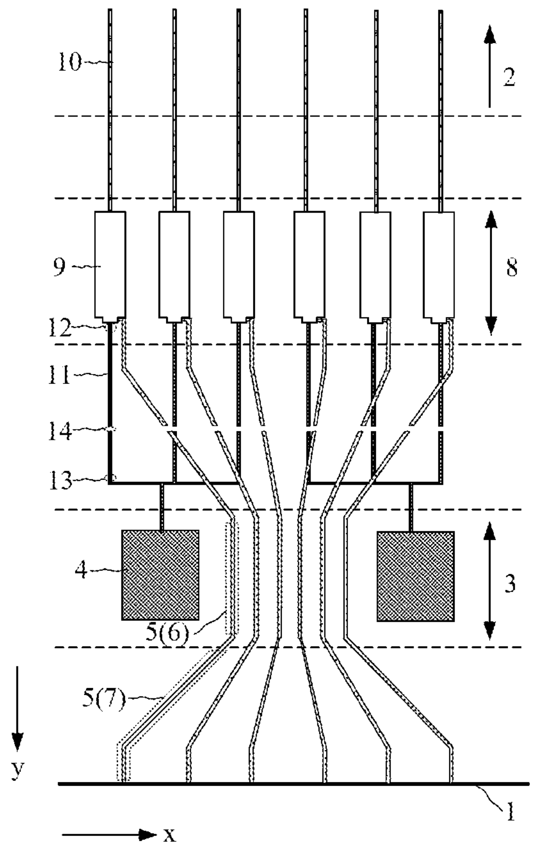
FIG. 5 is another schematic diagram of connections of the pins according to some embodiments of the present disclosure.

In addition, it is to be noted that, in some embodiments of the present disclosure, referring to FIG. 4, during the laser trimmer process, only the connection lines 11 are cut off, but the first electrostatic discharge protection wires 5 are not subjected to the laser. In this way, in the display panel 100 finally formed, the first electrostatic discharge protection wires 5 are still continuous, so the first electrostatic discharge protection wires 5 can still be utilized to discharge static electricity to the first edge 1. In some embodiments, as shown in FIG. 5 which is another schematic diagram of connections of the pins 9 according to some embodiments of the present disclosure, during the laser trimmer process, the first electrostatic discharge protection wires 5 are also cut off at the same time, which leads to a lower requirement on process accuracy and reduces process difficulty.

In one or more feasible embodiments, referring to FIG. 4 and FIG. 5 again, the second ends of the at least part of the pins 9 are further connected to the first electrostatic discharge protection wires 5. In this way, the first electrostatic discharge protection wires 5 are connected to the pins 9. In this way, static electricity in the to-be-tested display panel 600 is more easily conducted away via the first electrostatic discharge protection wires 5 during the testing of the to-be-tested display panel 600. Moreover, referring to FIG. 5, the first electrostatic discharge protection wires 5 are not disconnected by cutting of the laser, and when the display panel 100 is use, the static electricity in the display panel 100 is also more easily conducted away via the first electrostatic discharge protection wires 5.

Figure 6:
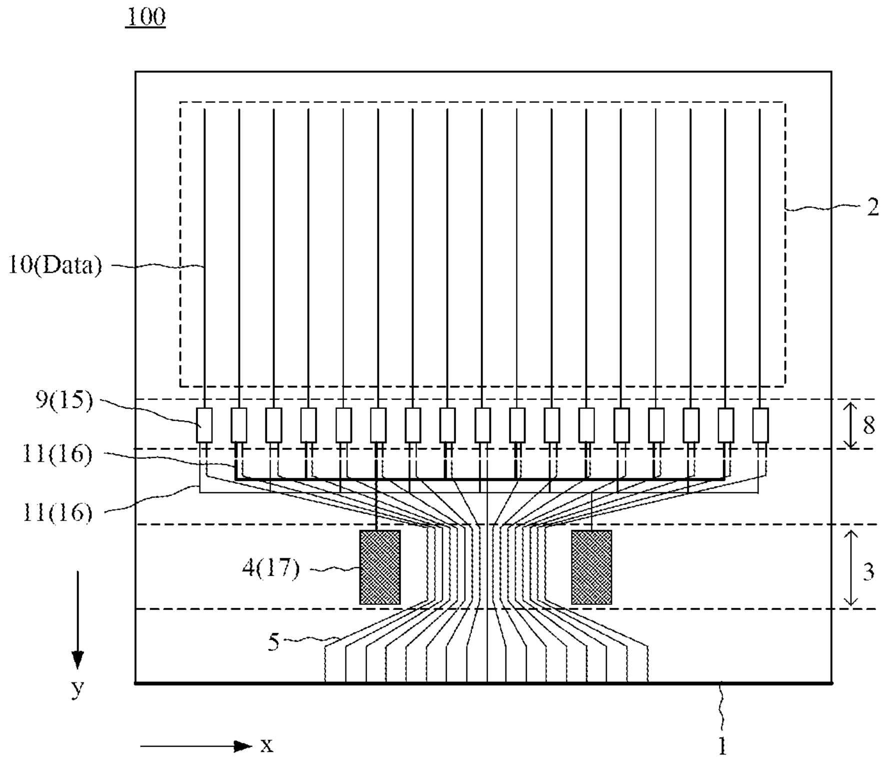
FIG. 6 is yet another schematic structural diagram of the display panel according to some embodiments of the present disclosure.
Figure 7:
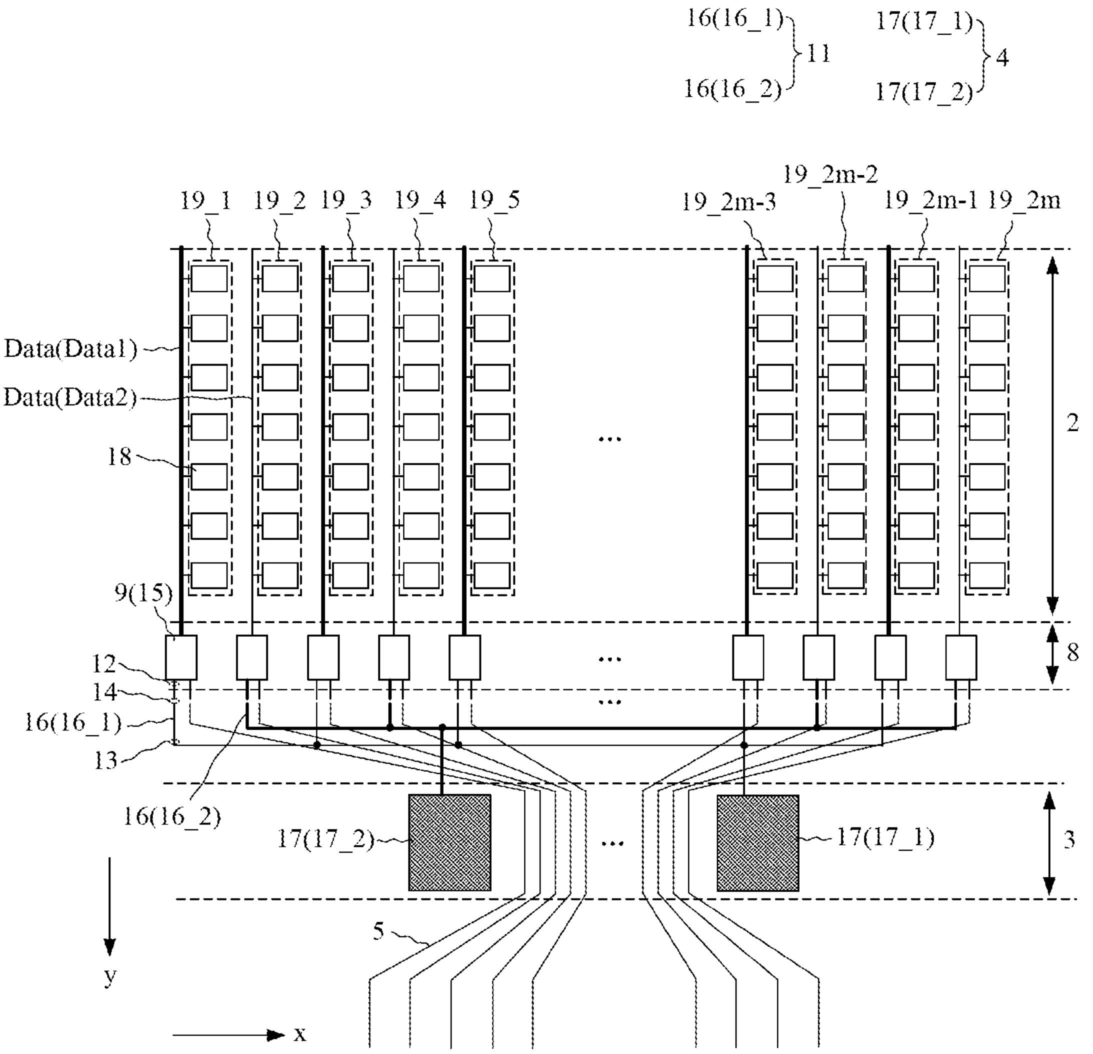
FIG. 7 is a schematic diagram of connections between data lines and first pads according to some embodiments of the present disclosure.

In one or more feasible embodiments, as shown in FIG. 6 which is yet another schematic structural diagram of the display panel 100 and FIG. 7 which is a schematic diagram of connections between data lines Data and first pads 17, the pins 9 include first pins 15, the driving signal lines 10 include data lines Data located in the display region 2, and the connection lines 11 include a plurality of first connection lines 16. First ends of the first pins 15 are connected to the data lines Data, and second ends of the first pins 15 are connected to first ends 12 of the first connection lines 16. It is to be noted that the first ends of the first pins 15 may be connected to the data lines Data in the display region 2 through fan-out lines located on the lower bezel.

The test pads 4 include at least two first pads 17. Each first pad 17 is connected to second ends 13 of multiple ones of the plurality of first connection lines 16. The first connection line 16 has a fracture 14 between the first end 12 and the second end 13 of the first connection line 16. That means, the first end 12 and the second end 13 of the first connection line 16 are disconnected. Moreover, the data lines Data corresponding to the first connection lines 16 connected to different first pads 17 are different. At least part of the first pads 17 are arranged along the first direction x, and at least two first pads 17 adjacent in the first direction x are spaced apart by one another by multiple first electrostatic discharge protection wires 5.

In one related design, all the data lines Data in the display region 2 are connected to only one test pad 4. When a test data voltage is applied to the one test pad 4, all sub-pixels in the display region 2 emit light at the same time, and only a single test pattern is displayed. However, due to a huge number, a high pixel density, and a dense arrangement of the sub-pixels in the display region 2, there is a high probability of false detection and missing detection during the testing, and thus some sub-pixels that cannot emit light normally are found out.

In some embodiments of the present disclosure, the data lines Data are classified into at least two groups, and each group corresponds to one first pad 17, so that the test data voltage can be applied to the at least two first pads 17 sequentially during the testing of the to-be-tested display panel 600. In this way, the to-be-tested display panel 600 displays multiple test patterns sequentially. When one of the at least first pads 17 receives the test data voltage, only the sub-pixels corresponding to the data lines Data connected to the one first pad 17 display the test pattern. The number of sub-pixels emitting light in the test pattern is smaller, so the probability of false detection and missing detection can be greatly reduced during the testing.

In addition, in some embodiments of the present disclosure, the first electrostatic discharge protection wires 5 are included between the at least two first pads 17 adjacent in the first direction x, so that the distance between adjacent first pads 17 can be reduced by reducing the spacing of the first line segments 6 of the first electrostatic discharge protection wires 5, thereby reducing an overall space required by all the first pads 17 in the first direction x and optimizing the arrangement of the first pads 17 on the lower bezel.

When one first pad 17 corresponds to multiple data lines Data, in one or more feasible embodiments, referring to FIG. 7, the display panel 100 further includes a plurality of pixel columns 19 arranged along the first direction x in the display region 2. The pixel column 19 includes multiple sub-pixels 18 arranged along the second direction y. The data lines Data include first data lines Data1 connected to a $2n-1^{th}$ pixel column 19 and second data lines Data2 connected to a $2n^{th}$ pixel column 19, where n is a positive integer. For clarity, an $i^{th}$ pixel column in FIG. 7 is denoted by a reference sign 19_*i*.

The first connection lines 16 include first-A connection lines 16_1 and first-B connection lines 16_2, first ends of the first-A connection lines 16_1 are connected to the first data lines Data1 respectively, and first ends of the first-B connection lines 16_2 are connected to the second data lines Data2 respectively.

The first pads 17 include at least one first-A pad 17_1 and at least one first-B pad 17_2, one of the first-A pads 17_1 is connected to multiple ones of the first-A connection lines 16_1, and one of the first-B pads 17_2 is connected to multiple ones of the first-B connection lines 16_2.

Taking the first-A pad 17_1 as an example, in the to-be-tested display panel 600, when the test data voltage is applied to the first-A pad 17_1, only the sub-pixels 18 in the odd-numbered pixel columns 19 emit light to form a test pattern. Any two adjacent odd-numbered pixel columns 19 that emit light are at least spaced by one even-numbered pixel column 19 that does not emit light. Therefore, in each test pattern, each two adjacent pixel columns 19 that emit light may be spaced by a certain distance. The sub-pixels 18 that should emit light but fail to emit light can be easily identified.

Figure 8:
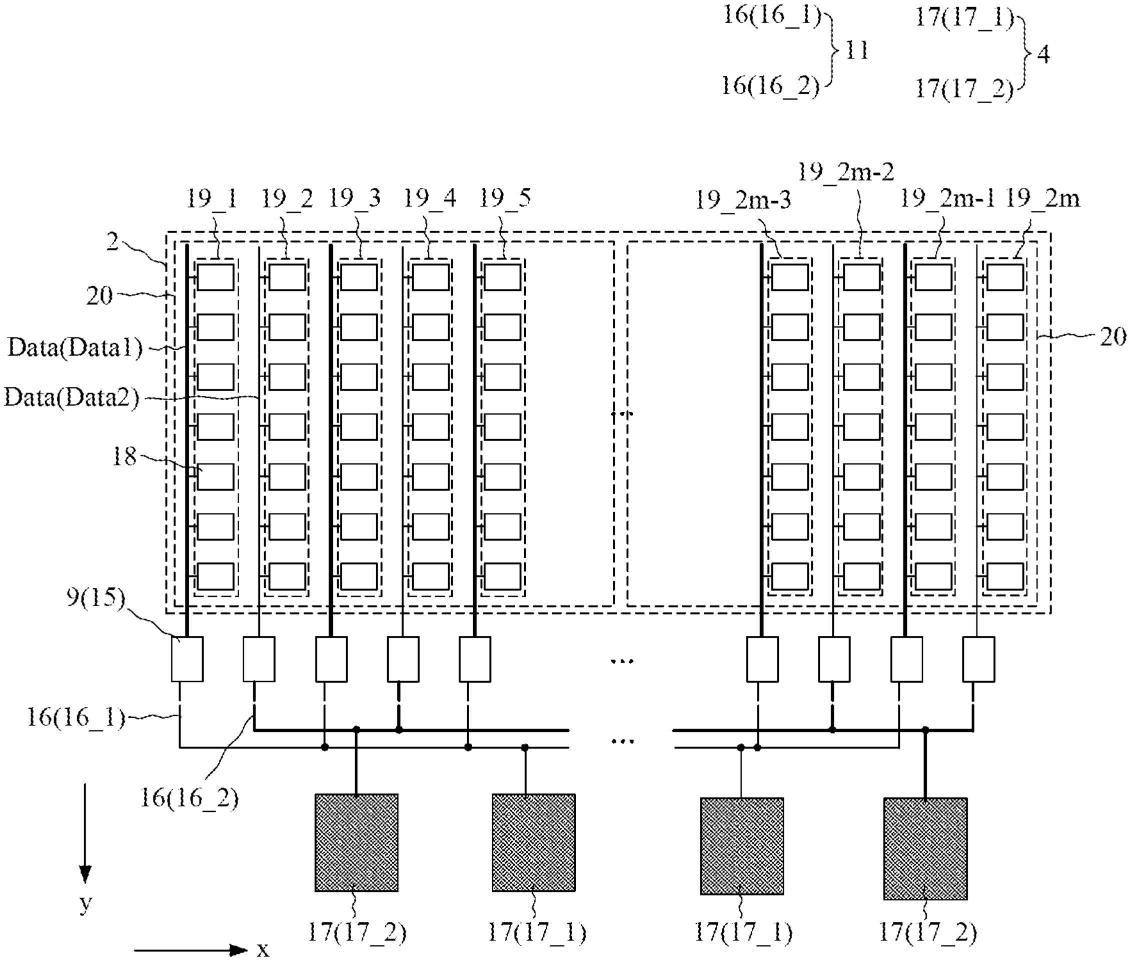
FIG. 8 is another schematic diagram of connections between the data lines and the first pads according to some embodiments of the present disclosure.

In some embodiments, as shown in FIG. 8, which is another schematic diagram of connections between the data lines Data and the first pads 17, the display region 2 includes at least two sub regions 20 arranged along the first direction x. At least two first-A pads 17_1 are provided, and the pixel columns 19 corresponding to the first-A connection lines 16_1 connected to the at least two first-A pads 17_1 are located in at least two different sub regions 20 respectively. Additionally or alternatively, at least two first-B pads 17_2 are provided, and the pixel columns 19 corresponding to the first-B connection lines 16_2 connected to the at least two first-B pads 17_2 are located in the at least two sub regions 20 respectively.

Still taking the first-A pads 17_1 as an example, in the above arrangement, the odd-numbered pixel columns 19 are further classified into at least two groups, and each group is located in one sub region 20. In this way, during the testing of the to-be-tested display panel 600, when the test data voltage is applied to one first-A pad 17_1, only the odd-numbered pixel columns 19 in a certain sub region 20 emit light and display a test pattern. As a result, any two pixel columns 19 that emit light are spaced apart, and the pixel columns 19 that emit light are not arranged too dispersedly in the entire display area 2, facilitating identification.

In the example shown in FIG. 8, the display region 2 is divided into two sub regions 20, the data lines Data in each sub region 20 are classified into two groups, and one group corresponds to one first-A pad 17_1 and the other group corresponds to one first-B pad 17_2. However, in other embodiments of the present disclosure, the sub regions 2 and the data lines Data may also be classified in other manners. For example, the display region 2 may be divided into three sub regions 20, and the data lines Data in each sub region 20 are classified into two groups that respectively correspond to one first-A pad 17_1 and one first-B pad 17_2. Alternatively, for a same sub region 20, the data lines Data corresponding to the odd-numbered pixel columns 19 in the sub region 20 may be classified into two groups that respectively correspond to two first-A pads 17_1, while the data lines Data corresponding to the even-numbered pixel columns 19 in the sub region 20 may be classified into only one group that corresponds to one first-B pad 17_2. Examples are not listed one by one in the embodiments of the present disclosure.

Figure 9:
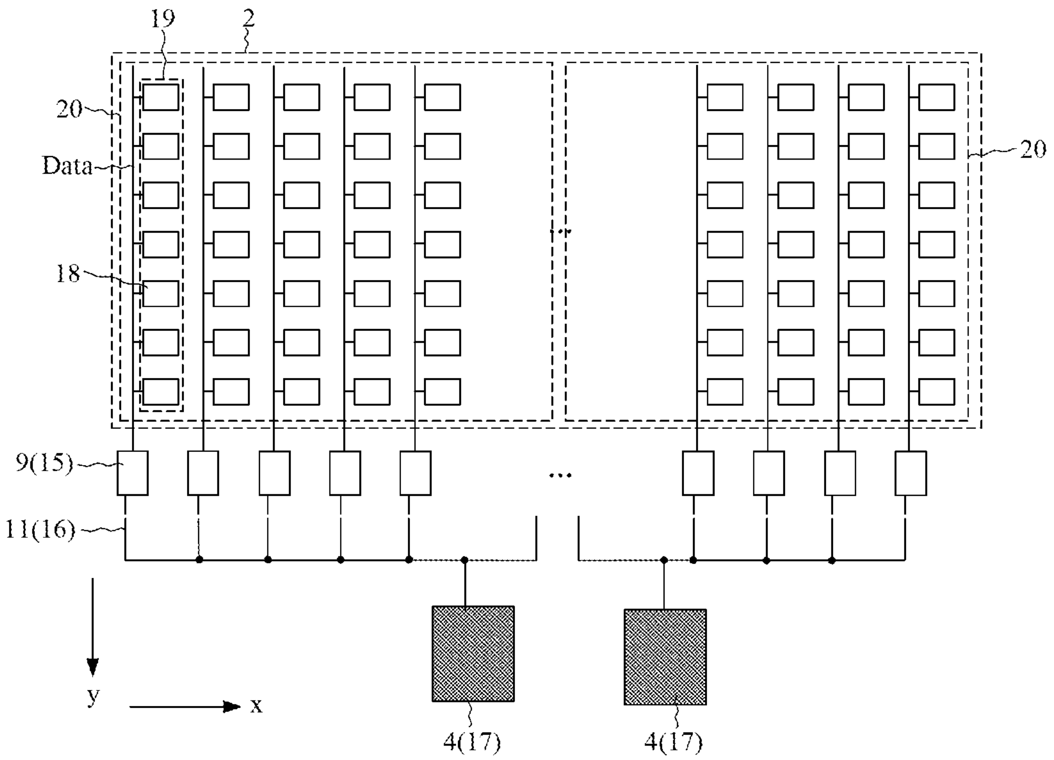
FIG. 9 is yet another schematic diagram of connections between the data lines and the first pads according to some embodiments of the present disclosure.

When one first pad 17 corresponds to multiple data lines Data, in some other embodiments, as shown in FIG. 9 which is yet another schematic diagram of connections between the data lines Data and the first pads 17, the display region 100 further includes a plurality of pixel columns 19 arranged along the first direction x in the display region 2.

The display region 2 includes at least two sub regions 20 arranged along the first direction x. The pixel columns 19 corresponding to the first connection lines 16 connected to the at least two first pads 17 are located in the at least two sub regions 20 respectively.

In the above arrangement, the data lines Data in each sub region 20 are classified into one group and connected to one first pad 17. During the testing of the to-be-tested display panel 600, the test data voltage may be applied to the at least two first pads 17 sequentially, and the sub-pixels 18 in the at least two sub regions 20 are controlled to present a test pattern sequentially. As a result, the number of sub-pixels 18 tested by each test pattern is smaller, and risks of false detection and missing detection are reduced. Moreover, in the arrangement, a smaller number of first pads 17 are required, which can reduce manufacturing difficulty of a test device.

Figure 10:
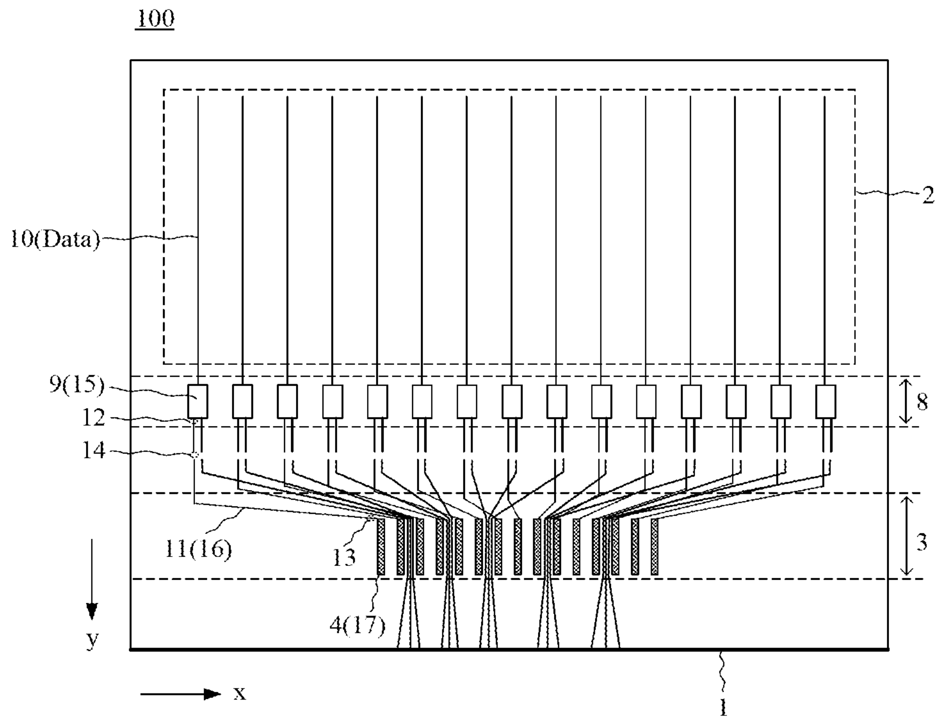
FIG. 10 is still another schematic diagram of connections between the data lines and the first pads according to some embodiments of the present disclosure.

In one or more feasible embodiments, as shown in FIG. 10 which is still another schematic diagram of connections between the data lines Data and the first pads 17, the pins 9 include first pins 15, the driving signal lines 10 include data lines Data located in the display region 2, and the connection lines 11 include first connection lines 16. First ends of the first pins 15 are connected to the data lines Data, and second ends of the first pins 15 are connected to first ends 12 of the first connection lines 16.

The test pads 4 include first pads 17. The first pads 17 are connected to the second ends 13 of the first connection lines 16 in a one-to-one correspondence manner. At least part of the first pads 17 are arranged along the first direction x, and at least two first pads 17 adjacent in the first direction x are spaced apart by the first electrostatic discharge protection wires 5.

In the above arrangement, during the testing of the to-be-tested display panel 600, the test data voltage may be applied to the first pads 17 sequentially, so that only the pixel column 19 corresponding to one data line Data, that is connected to the first pad 17 to which the test data voltage is applied, emits light to present a test pattern at a time. In some embodiments, the test data voltage may be simultaneously applied to some of the first pads 17, so that the pixel columns 19 corresponding to the data lines Data, that are connected to the some first pads 17 to which the test data voltage is applied, emit light to present a test pattern at a time. In this way, the number of the sub-pixels 18 tested in each test pattern is small, and the sub-pixels 18 that cannot emit light normally can be easily identified, greatly reducing the probability of false detection or missing detection.

In addition, in some embodiments of the present disclosure, at least two first pads 17 adjacent in the first direction x are spaced apart be multiple first electrostatic discharge protection wires 5, so that the distance between adjacent first pads 17 can be reduced by the dense arrangement of the first line segments 6 of the first electrostatic discharge protection wires 5, thereby reducing an overall space required by all the first pads 17 in the first direction x and optimizing the arrangement of the first pads 17 on the lower bezel.

In addition, in some embodiments, all the first pads 17 corresponding to the data lines Data are densely arranged in a middle region of the lower bezel, such that there is more space for arranging the test pads 4 connected to other signal lines.

Figure 11:
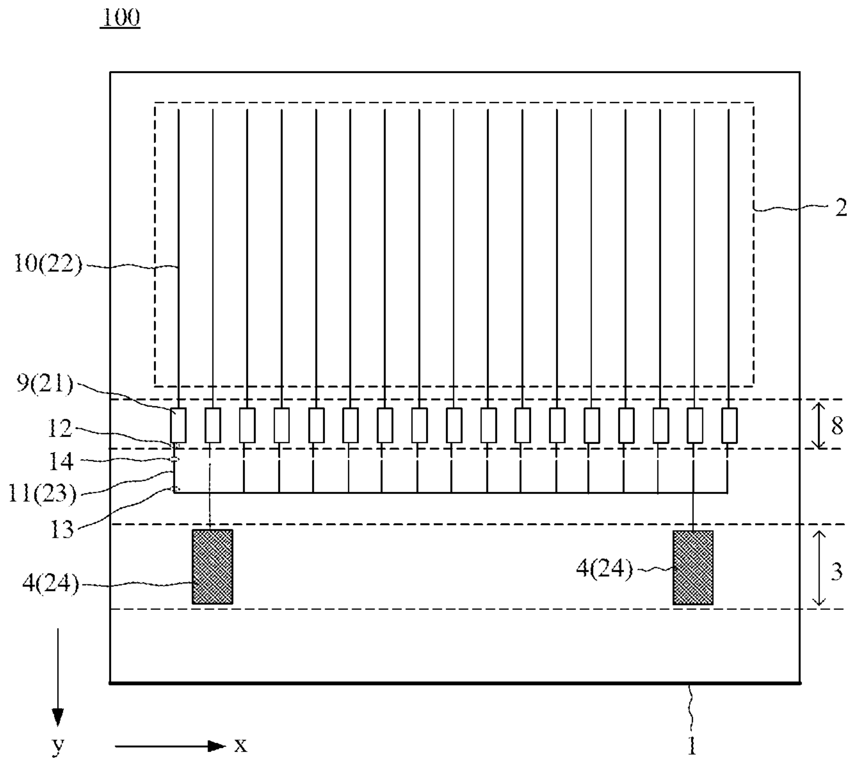
FIG. 11 is still another schematic structural diagram of the display panel according to some embodiments of the present disclosure.

In one or more feasible embodiments, as shown in FIG. 11 which is still another schematic structural diagram of the display panel 100, the pins 9 further include second pins 21, the driving signal lines 10 further include power signal lines 22 located in the display region 2, and the connection lines 11 further include second connection lines 23. A first end of one of the second pins 21 is connected to one of the power signal lines 22, and a second end of one of the second pins 21 is connected to a first end 12 of one of the second connection lines 23. The pads include second pads 24, and the second pads 24 are connected to second ends 13 of all the second connection lines 23. The second connection line 23 includes a fracture 14 between the first end 12 and the second end 13 of the second connection line 23.

Different from the manner in which the data lines Data are connected to the first pads 17, in some embodiments of the present disclosure, in the design of the connection between the power signal lines 22 and the second pads 24, the power signal lines 22 are not divided into groups, but all the power signal lines 22 are connected to the second pads 24. During the testing, when a test power voltage is applied to the second pads 24, no matter which pixel columns 19 are being driven to display a test pattern, the sub-pixels 18 in the pixel columns 19 can receive the test power voltage.

Since the driving signal lines 10 in the display panel 100 include multiple kinds of signal lines, if the multiple kinds of signal lines adopt a same grouping and testing method, it may be difficult to balance test accuracy and space saving. However, in the arrangement, the number of second pads 24 required by the power signal lines 22 can be reduced, thereby reducing a total number of the test pads 4 required to be arranged in the display panel 100.

In addition, in one related design, a power bus is arranged in a bezel region, the power signal lines 22 in the display region 2 are connected to the power bus, and then the power bus is connected to the pins 9. However, in order to prevent breakdown of the power bus by static electricity, the power bus may generally have a large width and be required to occupy a larger bezel space in the lower bezel, thereby leading to a larger width of the lower bezel in the second direction y. In the arrangement according to the embodiments of the present disclosure, each power signal line 22 is extended to the bonding region 8 and connected to the second pins 21, and there is no need to arrange the power bus, so a design size of the lower bezel in the second direction y can also be reduced.

In some embodiments, referring to FIG. 11 again, the pads include at least two second pads 24. In this way, during the testing, the test power voltage may be simultaneously applied to the at least two second pads 24, so that the test power voltage is transferred from the at least two second pads 24 to the power signal lines 22 in the display region 2 at the same time, thereby reducing voltage drop of the test power voltage during the transfer.

Figure 12:
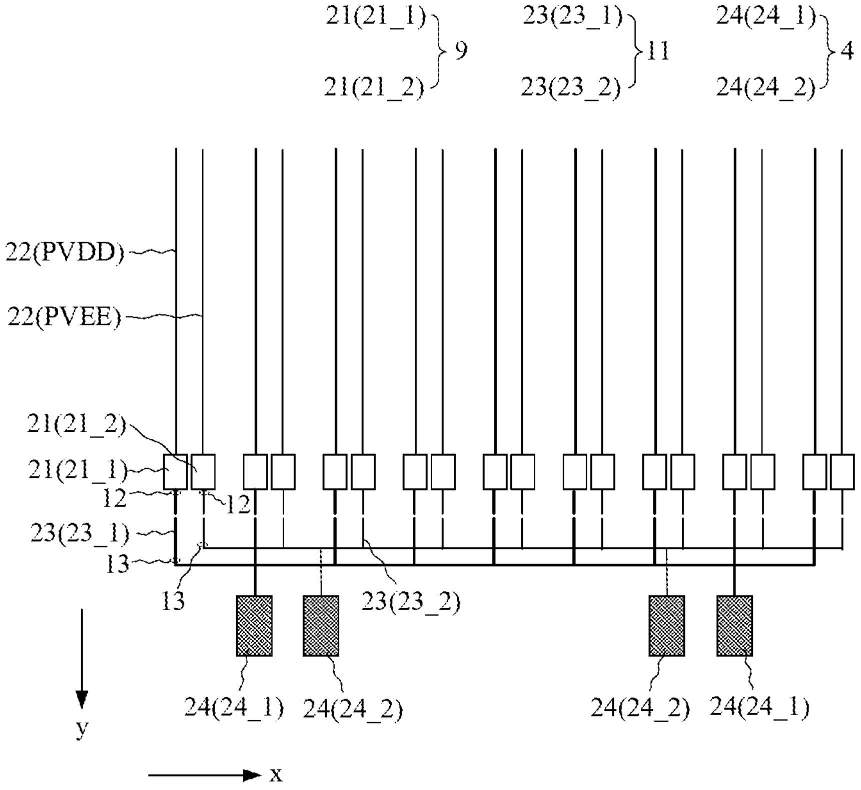
FIG. 12 is a schematic diagram of connections between power signal lines and second pads according to some embodiments of the present disclosure.

In one or more feasible embodiments, as shown in FIG. 12 which is another schematic diagram of connections between power signal lines 22 and second pads 24, the second pins 21 include second-A pins 21_1, the power signal lines 22 include positive power signal lines PVDD, and the second connection lines 23 include second-A connection lines 23_1. A first end of one of the first-A pins 21_1 is electrically connected to one of the positive power signal lines PVDD, and a second end of one of the first-A pins 21_1 is connected to a first end 12 of one of the second-A connection lines 23_1. The second pads 24 include second-A pads 24_1, and the second-A pads 24_1 are connected to second ends 13 of all the second-A connection lines 23_1.

Additionally or alternatively, the second pins 21 include second-B pins 21_2, the power signal lines 22 include negative power signal lines PVEE, and the second connection lines 23 include second-B connection lines 23_2. A first end of one of the second-B pins 21_2 is electrically connected to one of the negative power signal lines PVEE, and a second end of one of the second-B pins 21_2 is connected to a first end 12 of one of the second-B connection lines 23_2. The second pads 24 include second-B pads 24_2, and the second-B pads 24_2 are connected to second ends 13 of all the second-B connection lines 23_2.

For example, the sub-pixel 18 may include a pixel circuit and a light-emitting element. The light-emitting element may be a mini LED. The positive power signal line PVDD is electrically connected to the pixel circuit and configured to transfer a positive power supply voltage to the pixel circuit. The pixel circuit is driven to supply a driving voltage to an anode of the light-emitting element. The negative power signal line PVEE is electrically connected to the light-emitting element and configured to transfer a negative power supply voltage to the light-emitting element. When the anode of the light-emitting element is connected to the driving voltage, the light-emitting element emits light under the action of the driving voltage and the negative power supply voltage.

Figure 13:
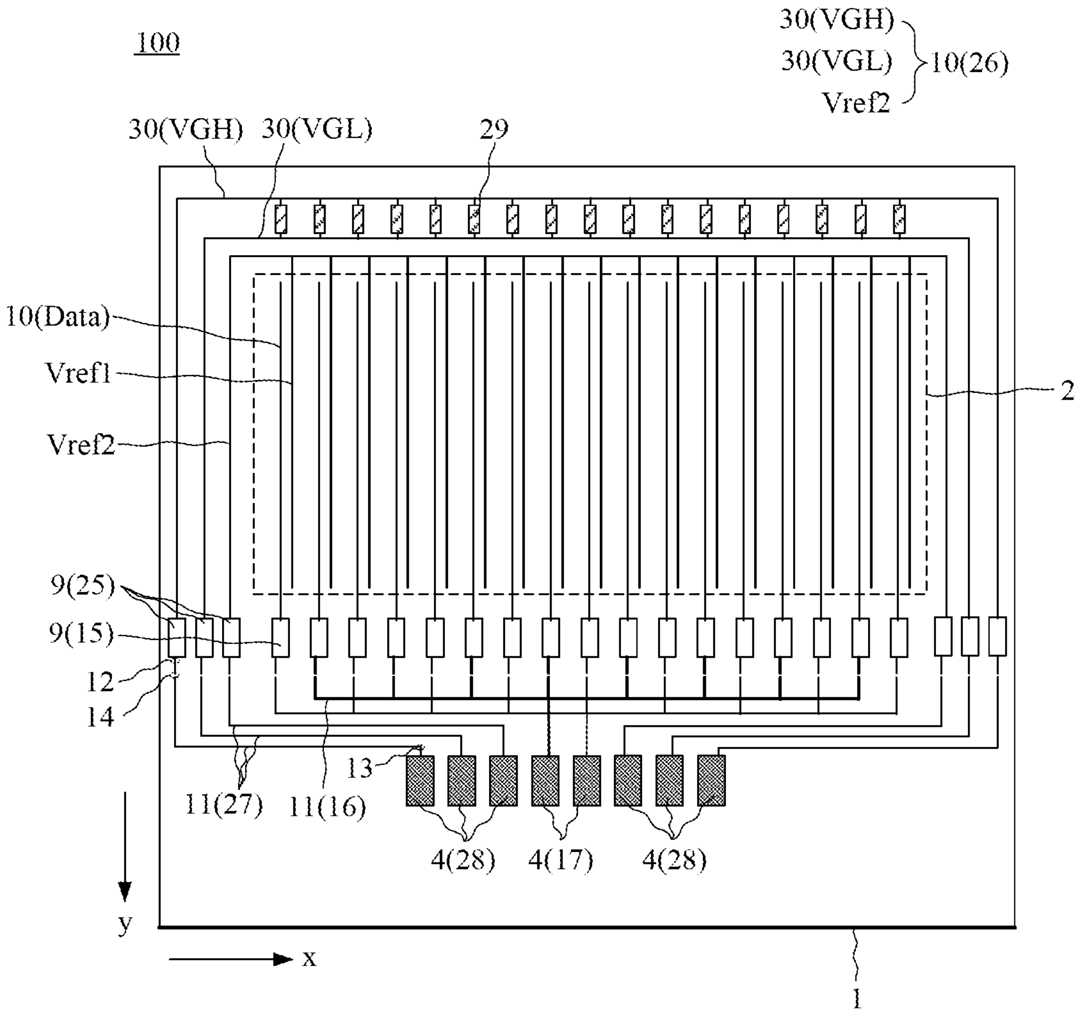
FIG. 13 is a further schematic structural diagram of the display panel according to some embodiments of the present disclosure.

In one or more feasible embodiments, as shown in FIG. 13 which is a further schematic structural diagram of the display panel 100, the pins 9 include third pins 25, the driving signal lines 10 include fixed potential signal lines 26 surrounding the display region 2, and the connection lines 11 include third connection lines 27. First ends of the third pins 25 are connected to the fixed potential signal lines 26, and second ends of the third pins 25 are connected to first ends 12 of the third connection lines 27. The test pads 4 include third pads 28, and the third pads 28 are connected to second ends 13 of the third connection lines 27.

During the testing of the to-be-tested display panel 600, generally, all kinds of signal lines in the to-be-tested display panel 600 are required to be tested. With reference to the foregoing content, both the data lines Data and the power signal lines 22 may be extended to the pins 9 and connected to the pins 9, and then connected to the test pads 4. In some embodiments of the present disclosure, the fixed potential signal lines 26 are not extended to the lower bezel but extended in a periphery region around the display region 2 to the third pins 25 and connected to the third pins 25. In this way, intersections between other connection lines 11 and the third connection lines 27 corresponding to the fixed potential signal lines 26 can be reduced, so that the third connection lines 27 corresponding to the fixed potential signal lines 26 can be arranged on a same layer as other connection lines 11, without the need to arrange an additional metal wire layer.

In some embodiments, referring to FIG. 13 again, two ends of each fixed potential signal line 26 are electrically connected to two third pins 25 respectively, and each of the two third pins 25 is connected to one of the third pads 28 through one of the third connection lines 27. During the testing of the to-be-tested display panel 600, the test power voltage can be applied to two third pads 28 at the same time, so that a test fixed voltage on the two third pads 28 is transferred from the two ends of the fixed potential signal line 26 to the middle of the fixed potential signal line 26 at the same time, which reduces voltage drop of the test fixed voltage during the transfer.

In some embodiments, referring to FIG. 13 again, in the second direction y, the third pins 25 do not overlap with the display region 2. In this way, the fixed potential signal line 26 connected to the third pins 25 does not intersect the connection wire (fan-out line) connected between the data line Data and the first pin 15 and the connection wire connected between the power signal line 22 and the second pin 21. The fixed potential signal line 26 may be arranged in a same layer as the connection wire (fan-out line) connected between the data line Data and the first pin 15 and the connection wire connected between the power signal line 22 and the second pin 21.

In one or more feasible embodiments, referring to FIG. 13 again, the display panel 100 further includes a protection circuit 29, and the fixed potential signal lines 26 include constant-voltage signal lines 30. The constant-voltage signal lines 30 surround the display region 2 and are connected to the protection circuit 29. In one arrangement, the constant-voltage signal lines 30 include a first constant-voltage signal line VGH and a second constant-voltage signal line VGL. The protection circuit 29 may be electrically connected to the data lines Data and configured to protect the data lines Data to prevent the data line Data from being broken down by static electricity.

Additionally or alternatively, referring to FIG. 13 again, the display panel 100 further includes first reset signal lines Vref1 extending along the second direction y in the display region 2. The first reset signal lines Vref1 are electrically connected to the pixel circuit and configured to transfer a reset voltage to the pixel circuit to cause the pixel circuit to perform a reset operation. The fixed potential signal lines 26 include a second reset signal line Vref2. The second reset signal line Vref2 surrounds the display region 2 and are connected to end portions of the first reset signal lines Vref1 away from the third pads 28. That is, the second reset signal line Vref2 and the first reset signal lines Vref1 are connected at an upper bezel. When a test reset voltage is transferred on the second reset signal line Vref2, the test reset voltage is quickly transferred to each first reset signal line, so as to be quickly inputted into the sub-pixels 18 of each pixel column 19.

Figure 14:
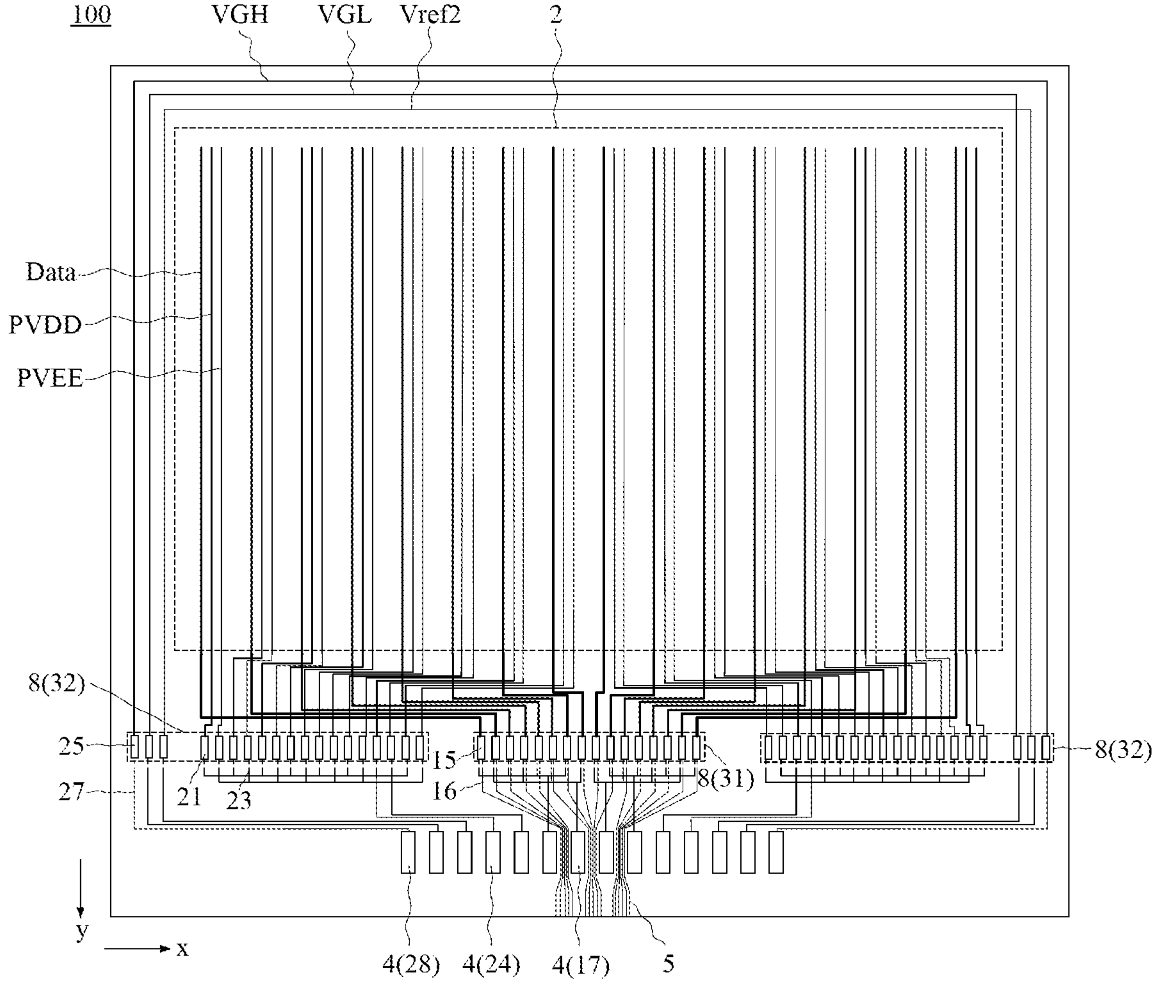
FIG. 14 is a further schematic structural diagram of the display panel according to some embodiments of the present disclosure.

In addition, it is also to be noted that, in some embodiments of the present disclosure, as shown in FIG. 14 which is a further schematic structural diagram of the display panel 100, the bonding region 8 may include a first bonding region 31 and two second bonding regions 32 located on two sides of the first bonding region 31 in the first direction x. The first pins 15 are located in the first bonding region 31. The first bonding region 31 is configured for binding the display panel with the driver chip. The second pins 21 and the third pins 25 are located in the second bonding regions 32. The second bonding regions 32 are configured for binding the display panel with the printed circuit board. Correspondingly, in order to optimize the routing and layout of the connection lines 11, the first pads 17 are densely arranged on the side of the first bonding region 31 away from the display region 2, the second pads 24 are located on outer sides of the first pads 17 in the first direction x, and the third pads 28 are located on outer sides of the second pads 24 in the first direction x.

In some embodiments of the present disclosure, the test pads 4 include the first pads 17, the second pads 24, and the third pads 28, the first electrostatic discharge protection wires 5 may be arranged between two adjacent first pads 17, the first electrostatic discharge protection wires 5 may be arranged between two adjacent second pads 24, and the first electrostatic discharge protection wires 5 may be arranged between two adjacent third pads 28. In some embodiments, the first electrostatic discharge protection wires 5 may be arranged between adjacent first and second pads 17 and 24, or between two adjacent second and third pads 24 and 28. This is not limited in the embodiments of the present disclosure.

Figure 15:
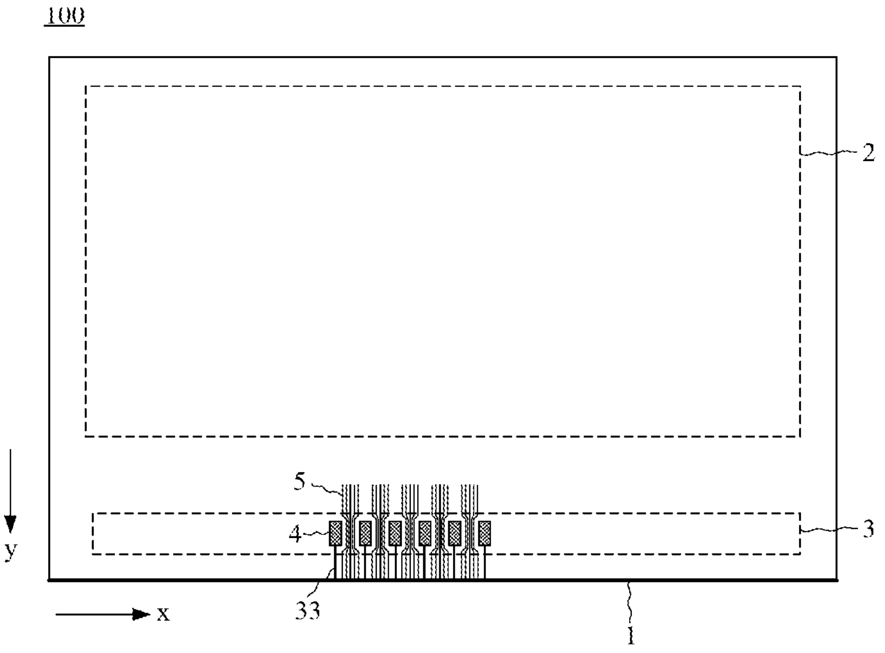
FIG. 15 is a further schematic structural diagram of the display panel according to some embodiments of the present disclosure.

In one or more feasible arrangement, as shown in FIG. 15 which is a further schematic structural diagram of the display panel 100, the test pads 4 are further connected to second electrostatic discharge protection wires 33, and the second electrostatic discharge protection wires 33 at least extend to the panel edge 1.

The connection of the test pads 4 to the second electrostatic discharge protection wires 33 can increase electrostatic discharge paths. During the testing of the to-be-tested display panel 600, electrostatic charges on the test pads 4 can be discharged through the second electrostatic discharge protection wires 33, so as to improve electrostatic discharge protection capability of the to-be-tested display panel 600 during the testing.

Figure 16:
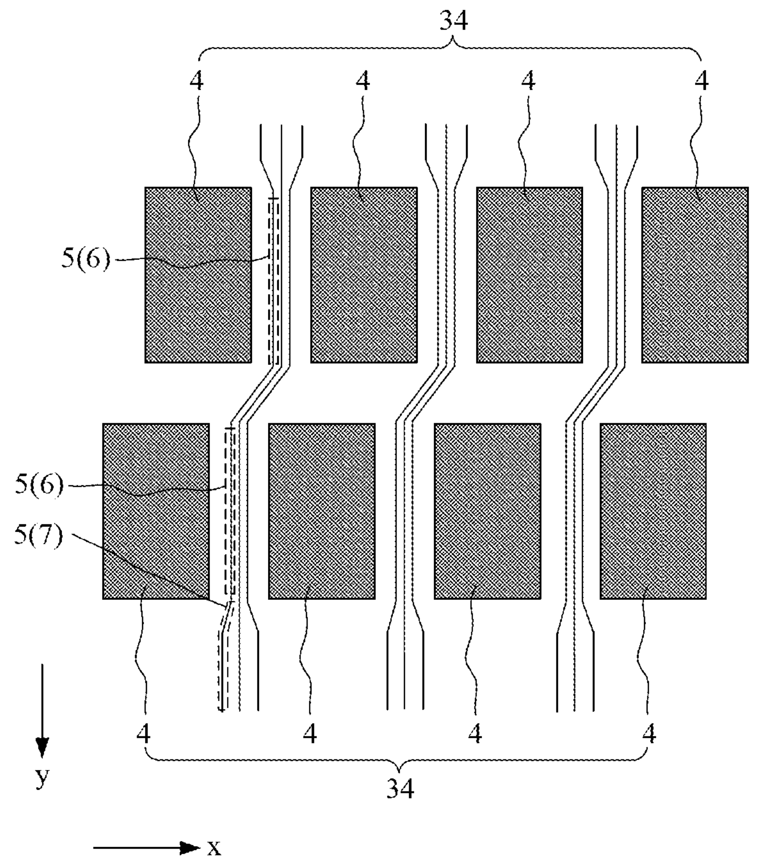
FIG. 16 is a schematic diagram of a layout of the test pads and the first electrostatic discharge protection wires according to some embodiments of the present disclosure.

In one or more feasible embodiments, as shown in FIG. 16 which is a schematic diagram of arrangement of the test pads 4 and the first electrostatic discharge protection wires 5, the test region 3 includes at least two pad groups 34 arranged along the second direction y, and each pad group 34 includes test pads 4 arranged along the first direction x. For the first line segments 6 between adjacent test pads 4 in each of the pad groups 34, the distance between any adjacent first line segments 6 is less than the distance between adjacent second line segments 7.

In the above arrangement, in the case of a large number of test pads 4, the test pads 4 may be arranged in at least two rows with the length of the lower bezel in the first direction x being fixed, which can increase a distance between two adjacent test pads 4 in the first direction x, thereby further increasing the distance between the test pad 4 and the first line segment 6 adjacent thereto and more greatly reducing a risk of short circuit between the first line segments 6 caused by scratches of the probe on the first line segments 6.

It is to be noted that the test pads 4 in the at least two pad groups 34 may be aligned or misaligned in the second direction y.

Figure 17:
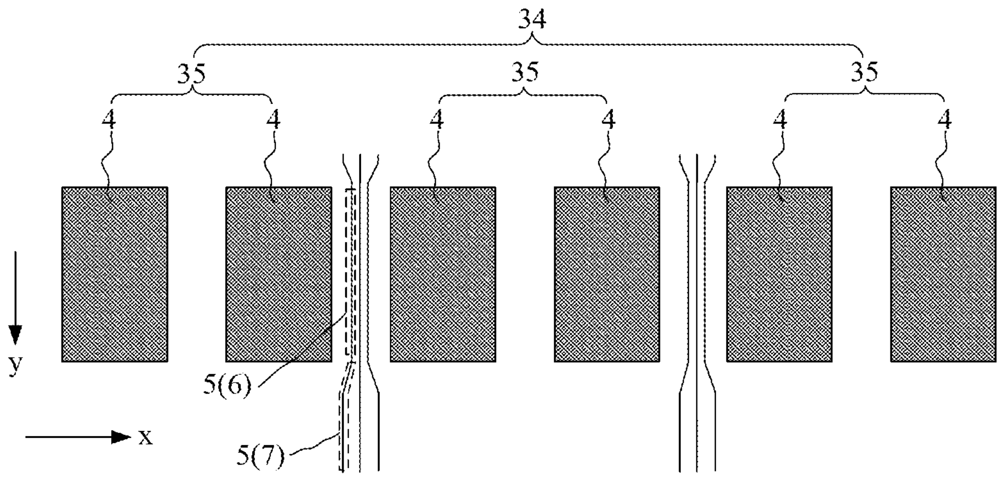
FIG. 17 is a schematic diagram of a layout of the test pads and the first electrostatic discharge protection wires according to some embodiments of the present disclosure.

In one or more feasible embodiments, as shown in FIG. 17 which is a schematic diagram of arrangement of the test pads 4 and the first electrostatic discharge protection wires 5, the test region 3 includes a pad group 34, the pad group 34 includes at least two pad units 35 arranged along the first direction x, and each pad unit 35 includes at least two test pads 4 arranged along the first direction x. The first electrostatic discharge protection wires 5 are not arranged between two adjacent test pads 4 in the pad unit 35. The first electrostatic discharge protection wires 5 are arranged between two adjacent pad units 35. For the first line segments 6 between any adjacent pad units 35, the distance between any adjacent first line segments 6 is less than the distance between adjacent second line segments 7.

In the above arrangement, one or two sides of one or more test pads 4 is not arranged with the first electrostatic discharge protection wire 5, so a risk of contact between the probe and the first line segment 6 can be reduced when the test voltage is applied to the test pads 4 by using the probe.

In addition, it is also to be noted that, in some embodiments of the present disclosure, the number of the first electrostatic discharge protection wires 5 may be greater than or equal to the number of the test pads 4, and two adjacent test pads 4 may be spaced apart by a same number of first electrostatic discharge protection wires 5 or a different number of first electrostatic discharge protection wires 5, which is not limited in the embodiments of the present disclosure.

Figure 18:
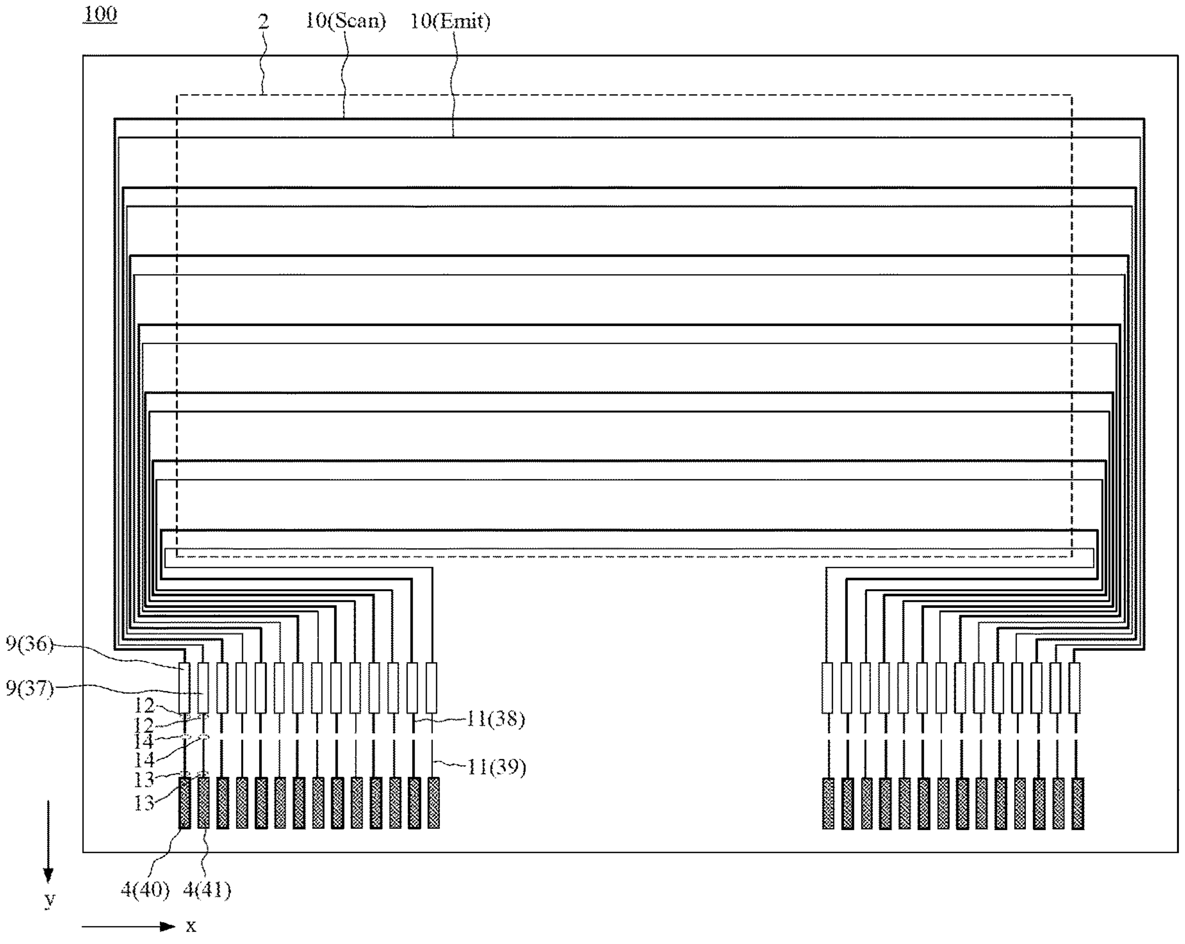
FIG. 18 is a further schematic structural diagram of the display panel according to some embodiments of the present disclosure.

In one or more feasible embodiments, as shown in FIG. 18 which is a further schematic structural diagram of the display panel 100, the driving signal lines 10 may further include scanning signal lines Scan extending along the first direction x in the display region 2. The scanning signal lines Scan are electrically connected to the pixel circuit in the sub-pixels 18 and configured to transmit a scanning signal to the pixel circuit to control the pixel circuit to perform a reset operation and a charging operation. The pins 9 further include fourth pins 36, the connection lines 11 further include fourth connection lines 38, and the test pads 4 further include fourth pads 40. One end of each scanning signal line Scan is connected to a first end of one of the fourth pins 36, or two ends of each scanning signal line Scan are connected to first ends of two of the fourth pins 36. Second ends of the fourth pins 36 are connected to first ends 12 of the fourth connection lines 38, and second ends 13 of the fourth connection lines 38 are connected to the fourth pads 40.

Additionally or alternatively, the driving signal lines 10 further include light emission control signal lines Emit extending along the first direction x in the display region 2. The light emission control signal lines Emit are electrically connected to the pixel circuits in the sub-pixels 18 and configured to transmit a light emission control signal to the pixel circuits to control the pixel circuits to perform a light emission control operation. The pins 9 further include fifth pins 37, the connection lines 11 further include fifth connection lines 39, and the test pads 4 further include fifth pads 41. One end of each light emission control signal line Emit is connected to a first end of one of the fifth pins 37, or two ends of each light emission control signal line Emit are connected to first ends of two of the fifth pins 37. Second ends of the fifth pins 37 are connected to first ends 12 of the fifth connection lines 39, and second ends 13 of the fifth connection lines 39 are connected to the fifth pads 41.

During the testing of the to-be-tested display panel 600, each fourth pad 40 applies a test scanning voltage to one corresponding scanning signal line Scan, and each fifth pad 41 applies a test light emission control voltage to one corresponding light emission control signal line Emit.

It is to be noted that the above design is generally applied to a mini LED display panel. In a liquid crystal display panel and an organic light-emitting diode display panel, the scanning signal lines Scan and the light emission control signal lines Emit are generally electrically connected to a shift register. Driven by signal lines such as clock signal lines and frame start signal lines, the shift register sequentially outputs the scanning signal to the scanning signal lines Scan or sequentially outputs the light emission control signal to the light emission control signal lines Emit. Based on the structure, it just needs to arrange some test pads 4 for providing test voltages to the signal lines such as the clock signal lines and the frame start signal lines, and the shift register can be normally driven to output signals during the testing. However, in the mini LED display panel, referring to FIG. 18, each scanning signal line Scan corresponds to one or two fourth pads 40, and each light emission control signal line Emit corresponds to one or two fifth pads 41. As a result, a large number of test pads 4 are required in such display panels, and the number of the test pads 4 in the mini LED display panel may generally be much greater than the number of the test pads 4 in the liquid crystal display panel or the organic light-emitting diode display panel. Therefore, the design of the first electrostatic discharge protection wires 5 according to the embodiments of the present disclosure can bring an improved effect to the mini LED display panel.

Based on a similar inventive concept, some embodiments of the present disclosure further provide a motherboard 200. FIG. 19 is a schematic structural diagram of a motherboard 200 according to some embodiments of the present disclosure. Referring to FIG. 1, FIG. 2 and FIG. 19, the motherboard 200 includes a plurality of panel regions 300. Each panel region 300 corresponds to a to-be-tested display panel 600.

The panel region 300 includes a first edge 400 extending along a first direction x, and a display region 2 and a test region 3 arranged along a second direction y. The first direction x intersects the second direction y. The test region 3 is located between the display region 2 and the first edge 400. The test region 3 includes a plurality of test pads 4, at least part of the test pads 4 are arranged along the first direction x, and at least two of the test pads 4 adjacent in the first direction x are spaced apart by first electrostatic discharge protection wires 5. The first electrostatic discharge protection wires 5 extend from one side of the display region 2 adjacent to the test region 3 to the first edge 400.

Referring to FIG. 2, each first electrostatic discharge protection wire 5 includes a first line segment 6 and a second line segment 7, the first line segment 6 is located between two adjacent test pads 4, and the second line segment 7 is connected to the first line segment 6. The distance between adjacent first line segments 6 between two adjacent test pads 4 in the first direction x is less than the distance between adjacent second line segments 7 in the first direction x.

In one manufacturing process of the above display panel 100, referring to FIG. 19 and FIGS. 37A-37D, the motherboard 200 is cut to form a plurality of independent to-be-tested display panels 600 and then the to-be-tested display panels 600 are tested, so as to prevent material waste caused by bonding the defective display panel with a driver chip or a printed circuit board. During the testing, test voltages are applied to the test pads 4 in the to-be-tested display panel 600, the test voltages are transferred to various signal lines to control the to-be-tested display panel 600 to display a test pattern, and then it is determined according to the displayed test pattern whether the to-be-tested display panel 600 can emit light normally. After being tested, the to-be-tested display panel 600 is further processed to form the display panel.

In some embodiments of the present disclosure, the distance d1 between adjacent first line segments 6 is reduced, that is, the first line segments 6 are closer to one another (that is, densely arranged), which can reduce a total arrangement width of the first line segments 6 in the first direction x. Accordingly, when the distance between two adjacent test pads 4 is fixed, the distance d3 between the first line segment 6 and the test pad 4 can be increased, and thus the first line segment 6 is spaced apart from the test pad 4 by a reliable distance. In this way, during the testing of the to-be-tested display panel 600, the test voltage is applied to the test pad 4 by a probe, the probe is prevented form scratching the first line segment 6, thereby preventing short circuit between the test pad 4 and the first line segment 6 and short circuit between two adjacent first line segments 6. In some embodiments, the first electrostatic discharge protection wires 5 are connected to the pins, the short circuit between the test pad 4 and the first line segment 6 and short circuit between two adjacent first line segments 6 may cause short circuit between the pins, and the above configuration can prevent such short circuit between the pins, thereby preventing false detection during the testing of the to-be-tested display panels 600.

In addition, when a larger number of test pads 4 are arranged in the panel region 300, with the first line segments 6 are densely arranged, the distance between two adjacent test pads 4 can also be reduced on the premise of ensuring a sufficient distances between the first line segment 6 and the test pad 4, thereby reducing a total width required arranging the test pads 4 in the first direction x and optimizing the arrangement of the test pads 4 on the lower bezel.

In addition, it is also to be noted that, referring to FIG. 19, in the motherboard 200, the first electrostatic discharge protection wires 5 of each panel region 300 are further extended to the outside of the panel region 300 and then connected together, and then are led to an outer edge of the motherboard 200 through a wire. In this way, static electricity generated in the manufacturing process of the motherboard 200 is discharged to the outside of the motherboard 200, and thus electrostatic discharge protection is provided for the motherboard 200.

In some embodiments, referring to FIG. 2, the distance between the test pad 4 and the first line segment 6 adjacent thereto in the first direction x is greater than the distance between adjacent first line segments 6 that are disposed between two adjacent test pads 4 in the first direction x. In this way, a sufficient distance between the test pad 4 and its nearest first line segment 6 is ensured, thereby preventing the probe from scratching the first line segments 6 during the testing.

Figure 20:
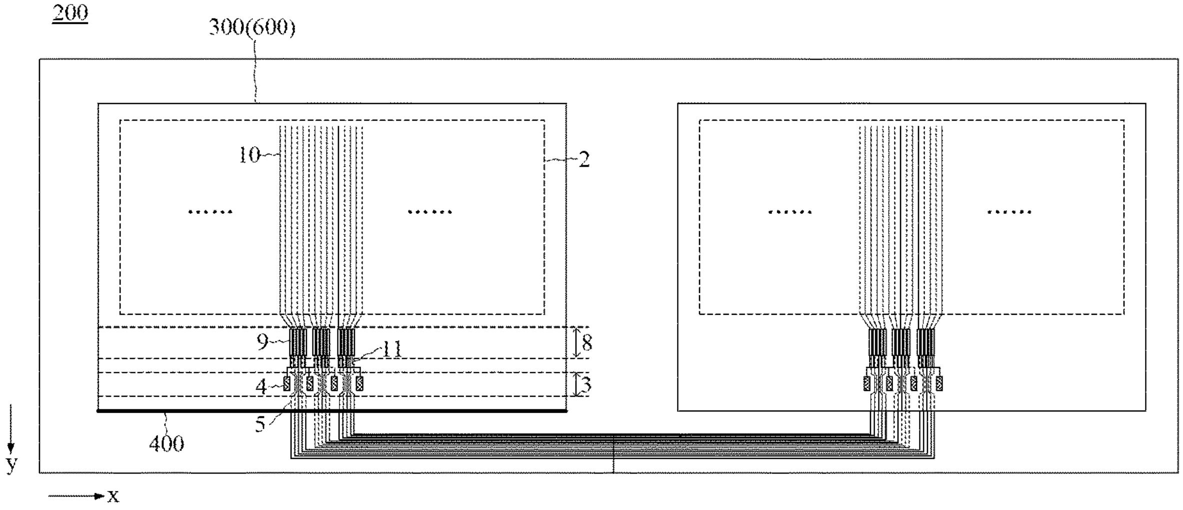
FIG. 20 is a schematic structural diagram of the motherboard according to some embodiments of the present disclosure.
Figure 21:
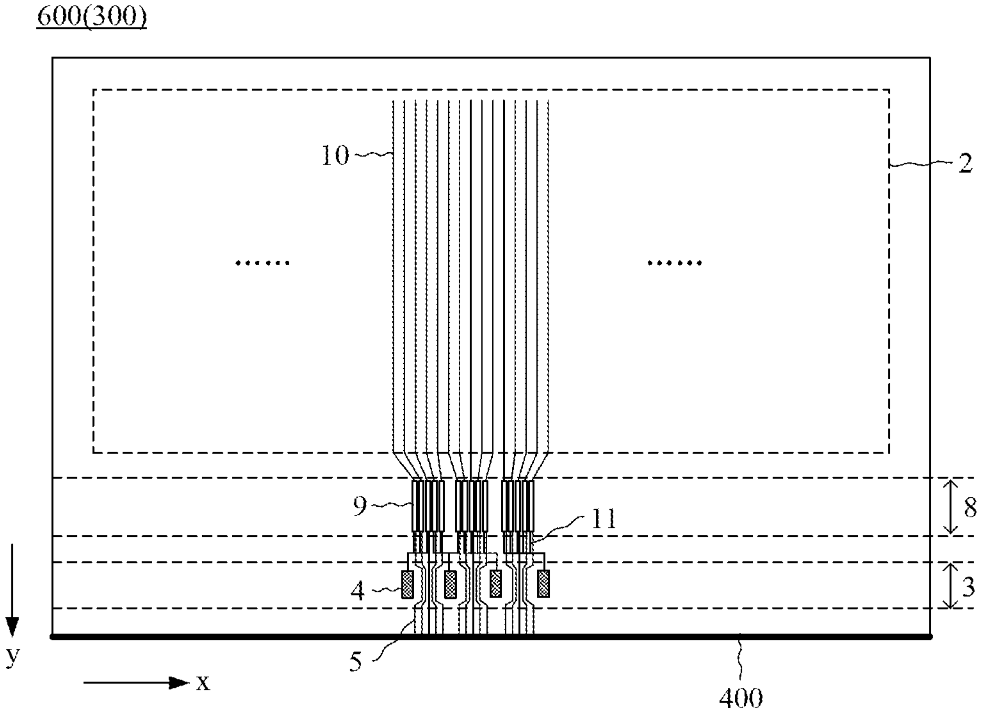
FIG. 21 is a schematic structural diagram of a single to-be-tested display panel corresponding to FIG. 20.

In one or more feasible embodiments, as shown in FIG. 20 which is a schematic structural diagram of the motherboard 200 and FIG. 21 which is a schematic structural diagram of a single to-be-tested display panel 600 in FIG. 20, the panel region 300 further includes a bonding region 8 between the display region 2 and the test region 3, and the bonding region 8 includes a plurality of pins 9. At least one of the plurality of pins 9 each includes a first end electrically connected to one of the driving signal lines 10, and a second end electrically connected to one of the test pads 4 through one of the connection lines 11.

Based on the above structure, during the testing of each to-be-tested display panel 600, a test voltage is applied to the test pad 4, and the test voltage is transferred to the driving signal line 10 via the connection line 11 and the pin 9 and then drives the to-be-tested display panel 600 to display a test pattern.

In some embodiments, referring to FIG. 20 and FIG. 21 again, the second ends of at least part of the pins 9 are further connected to the first electrostatic discharge protection wires 5. In this way, the first electrostatic discharge protection wires 5 are connected to the pins 9, so that static electricity in the to-be-tested display panel 600 is more easily conducted away via the first electrostatic discharge protection wires 5 during the testing of the to-be-tested display panel 600.

In one or more feasible embodiments, referring to FIG. 22 to FIG. 26, each second line segment 7 includes a first-type second line segment 40. The first-type second line segment 40 is located on the side of the first line segment 6 close to the first edge 400. The distance between adjacent first-type second line segments 40 in the first direction x is greater than the distance between adjacent first line segments 6 located between two adjacent test pads 4 in the first direction x.

With reference to the foregoing content, in some embodiments of the present disclosure, the motherboard 200 may form the display panels 100 in two manners.

Figure 22:
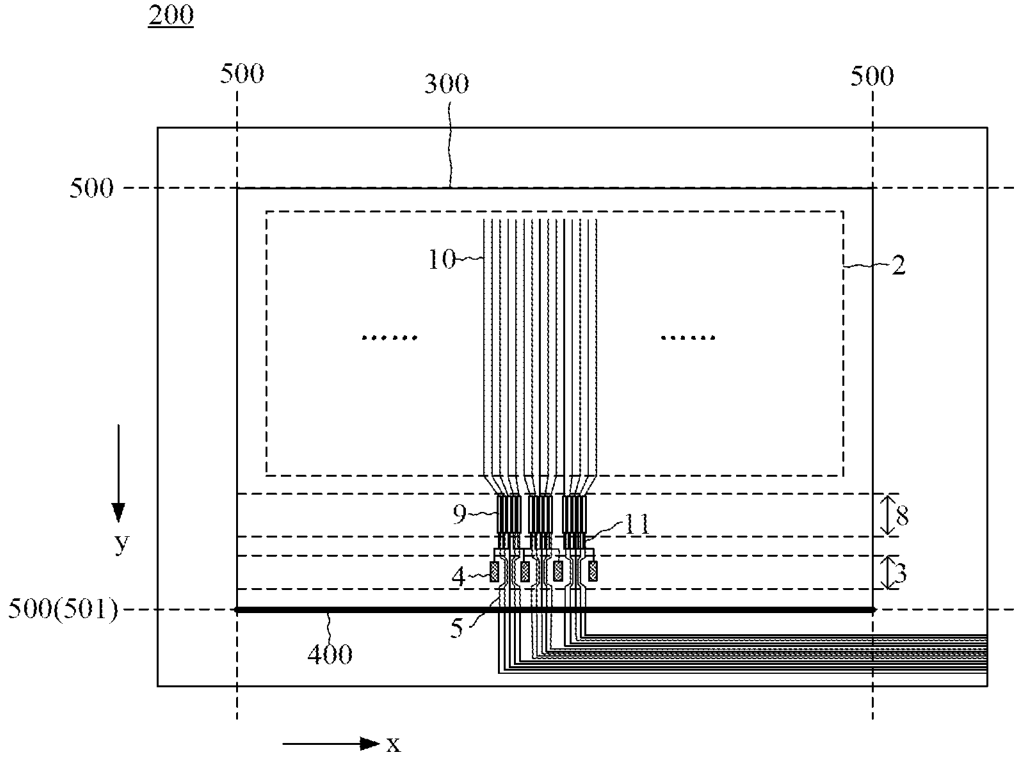
FIG. 22 is a schematic diagram of a partial structure of the motherboard according to some embodiments of the present disclosure.
Figure 23:
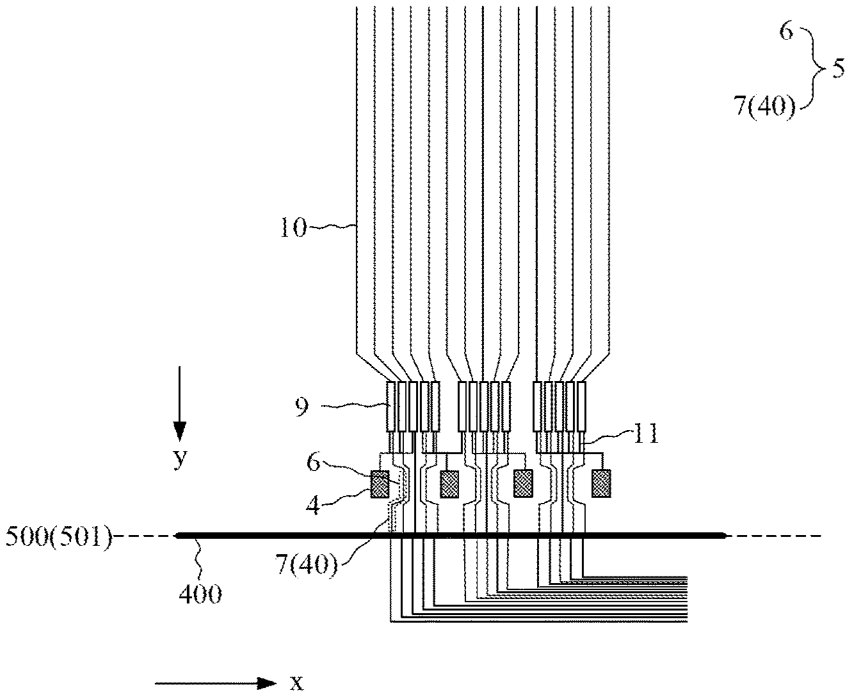
FIG. 23 is a schematic partial enlarged view of FIG. 22.

FIG. 22 is a schematic diagram of a partial structure of the motherboard 200 according to some embodiments of the present disclosure, and FIG. 23 is a schematic partial enlarged view of FIG. 22. In a first manufacturing process of the display panel 100, referring to FIG. 1 to FIG. 5, FIG. 22, FIG. 23, and FIGS. 37A-37D, after the formation of the motherboard 200, the motherboard 200 is cut along cutting lines 500 to form the plurality of to-be-tested display panels 600. The cutting lines 500 include a first cutting line 501. The first cutting line 501 coincides with the first edge 400. Then, the to-be-tested display panels 600 are tested. After the testing, referring to FIG. 3 to FIG. 5, the connection lines 11 in the to-be-tested display panel 600 are cut off by laser, and fractures 14 are formed on the connection lines 11, so as to form the display panel 100 shown in FIG. 3.

That is, the structure where the test pads 4 are located are kept in the display panel 100 formed according to the above method. After the testing of the to-be-tested display panel 600, reliability of display can be improved by disconnecting the connection lines 11 between the test pads 4 and the pins 9.

In the above structure, the first-type second line segments 40 are adjacent to the first edge 400, i.e., adjacent to the first cutting line 501. In some embodiments of the present disclosure, the distance between adjacent first-type second line segments 40 is designed to be larger, so that, when the motherboard 200 is cut along the first cutting line 501. In this way, even if a metal particle generated by cutting falls between the adjacent first-type second line segments 40, it is difficult for the metal particle to contact both the two first-type second line segments 40 at the same time, thereby preventing short circuit of the adjacent first-type second line segments 40 and then preventing adverse effects on the testing.

Figure 24:
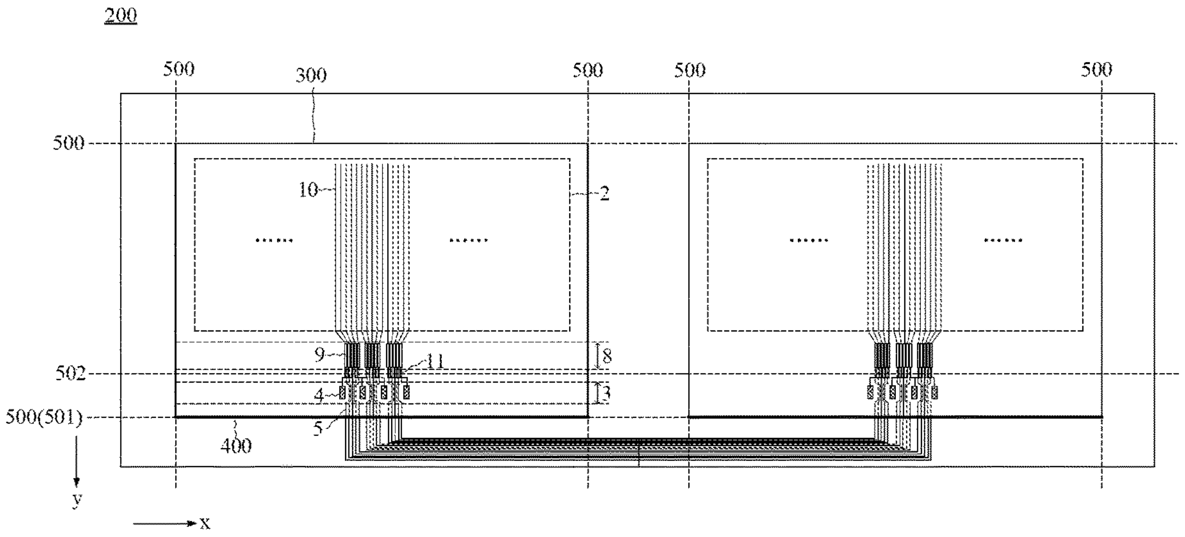
FIG. 24 is another schematic structural diagram of the motherboard according to some embodiments of the present disclosure.
Figure 25:
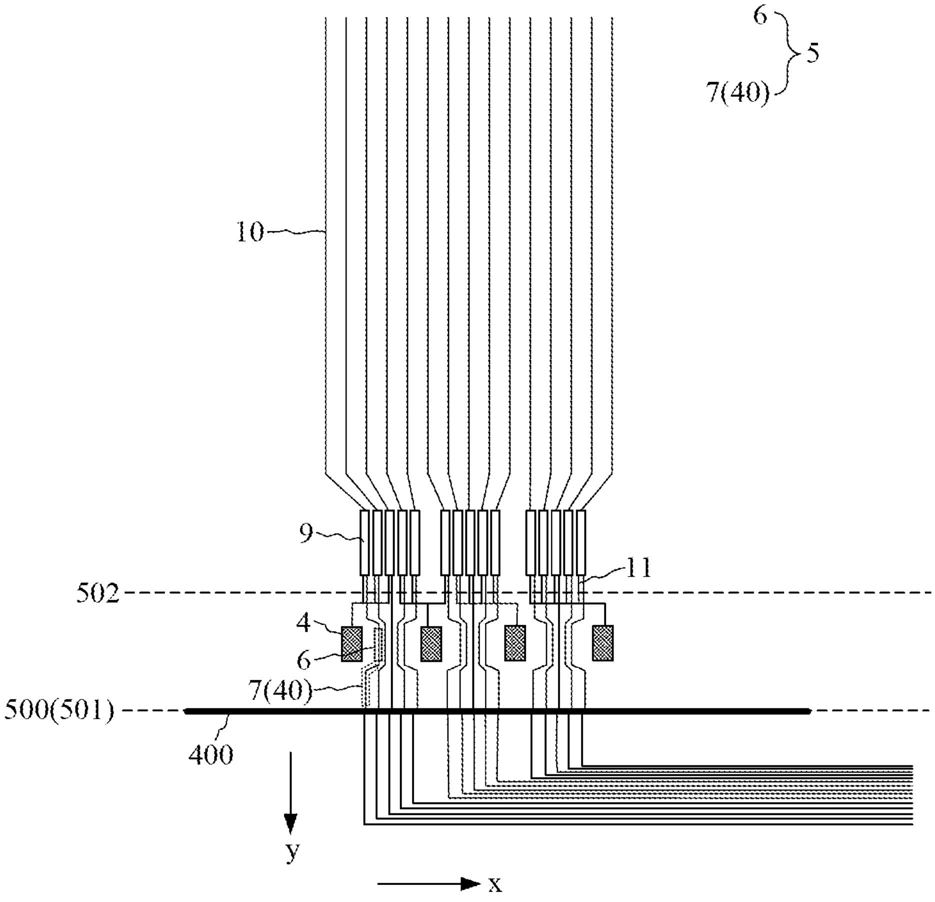
FIG. 25 is a schematic partial enlarged view corresponding to FIG. 24.
Figure 26:
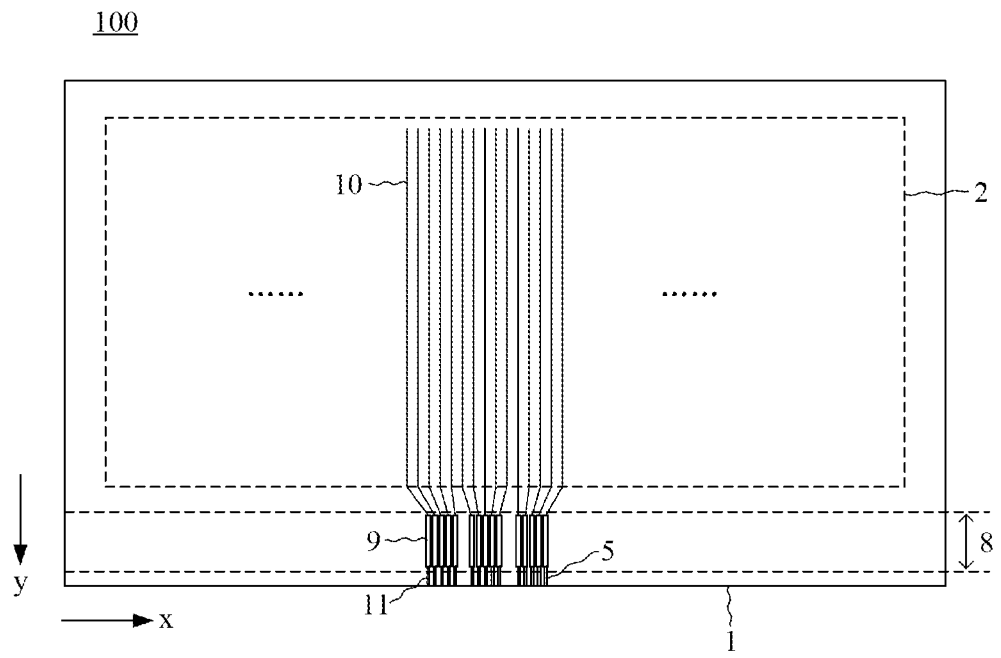
FIG. 26 is a further schematic structural diagram of the display panel according to some embodiments of the present disclosure.

FIG. 24 is another schematic structural diagram of the motherboard 200 according to some embodiments of the present disclosure, FIG. 25 is a schematic partial enlarged view corresponding to FIG. 24, and FIG. 26 which is a further schematic structural diagram of the display panel 100 according to some embodiments of the present disclosure. In a second manufacturing process of the display panel 100, as shown in FIGS. 38A-38C and FIG. 24 to FIG. 26, after the formation of the motherboard 200, the motherboard 200 is cut along cutting lines 500 to form a plurality of to-be-tested display panels 600. The cutting lines 500 include a first cutting line 501. The first cutting line 501 coincides with the first edge 400. Then, the to-be-tested display panels 600 are tested. After the testing, the to-be-tested display panel 600 is cut along a second cutting line 502 to form the display panel 100. The second cutting line is located between the pins 9 and the test pads 4.

That is, the structure where the test pads 4 are located are not kept in the display panel 100 obtained according to the above method. After the testing of the to-be-tested display panel 600, the structure where the test pads 4 are located is removed by directly cutting along the second cutting line 502.

In the above structure, the first-type second line segments 40 are adjacent to the first edge 400, i.e., adjacent to the first cutting line 501. In some embodiments of the present disclosure, the distance between adjacent first-type second line segments 40 is designed to be larger. In this way, when the motherboard 200 is cut along the first cutting line 501, short circuit of the adjacent first-type second line segments 40 caused by the metal particle generated by cutting can be prevented, thereby preventing adverse effects on the testing.

Figure 27:
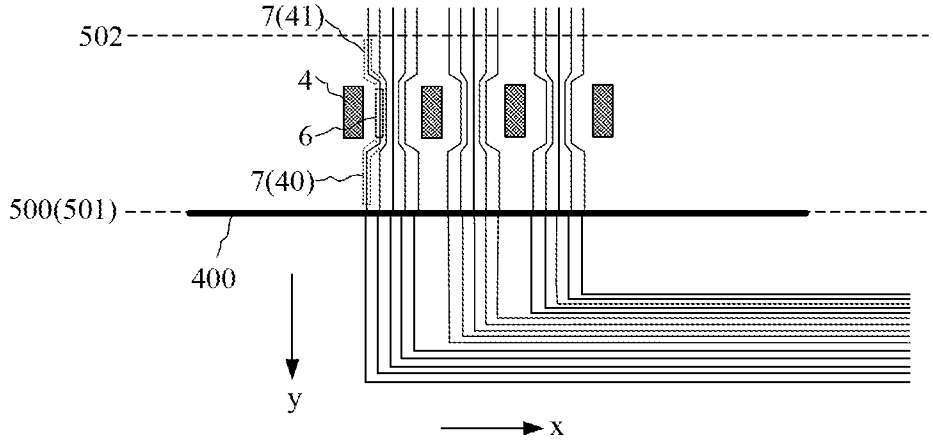
FIG. 27 is another schematic partial enlarged view corresponding to FIG. 24.

FIG. 27 is another schematic partial enlarged view corresponding to FIG. 24. In one or more feasible embodiments, referring to FIG. 24 to FIG. 27, each second line segment 7 includes a second-type second line segment 41. The second-type second line segment 41 is located on a side of the first line segment 6 away from the first edge 400. The distance between adjacent second-type second line segments 41 is greater than the distance between adjacent first line segments 6.

With reference to the above description of the second manufacturing process of the display panel 100, after the testing of the to-be-tested display panel 600, on the side of the first line segments 6 away from the first edge 400, the to-be-tested display panel 600 is cut along the second cutting line 502. The distance between adjacent second-type second line segments 41 is designed to be larger. In this way, when the to-be-tested display panel 600 is cut along the second cutting line 502, short circuit of two adjacent first-type second line segments 40 caused by the metal particle generated by cutting can also be prevented.

Figure 28:
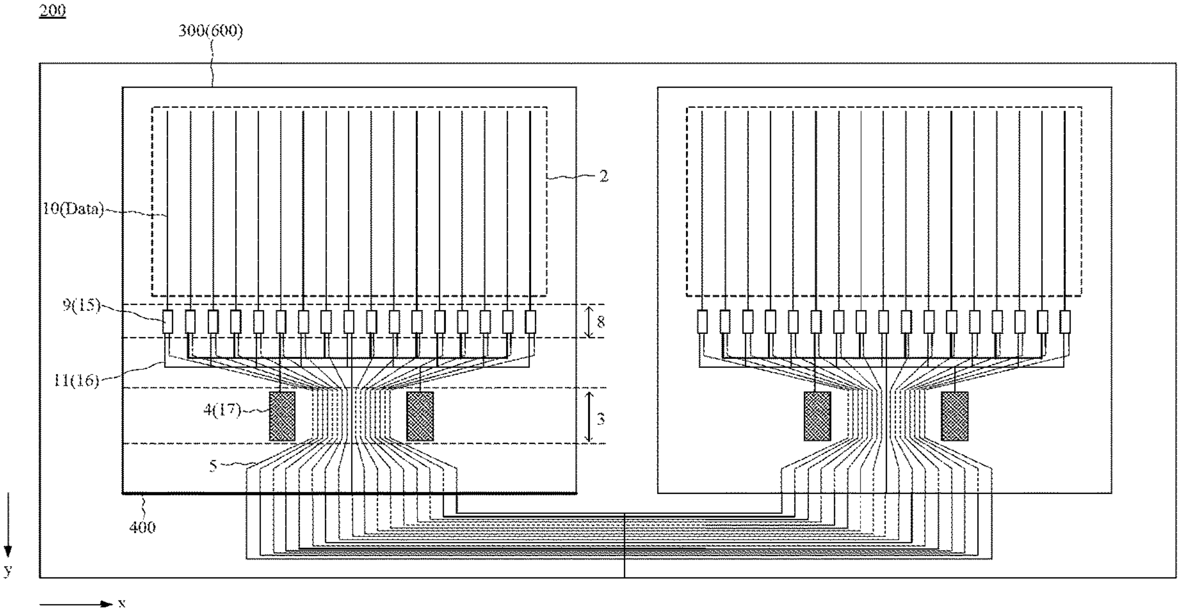
FIG. 28 is yet another schematic structural diagram of the motherboard according to some embodiments of the present disclosure.

FIG. 28 is yet another schematic structural diagram of the motherboard 200 according to some embodiments of the present disclosure. In one or more feasible embodiments, as shown in FIG. 28, the pins 9 include first pins 15, the driving signal lines 10 include data lines Data located in the display region 2, and the connection lines 11 include first connection lines 16. First ends of the first pins 15 are electrically connected to the data lines Data, and second ends of the first pins 15 are electrically connected to the first connection lines 16. The test pads 4 include first pads 17, one of the first pads 17 is electrically connected to multiple ones of the first connection lines 16, and different data lines Data are connected to different first pads 17.

At least two first pads 17 of the first pads 17 are arranged along the first direction x, and the at least two first pads 17 adjacent in the first direction x are spaced apart by multiple first electrostatic discharge protection wires 5.

In some embodiments of the present disclosure, the data lines Data are classified into at least two groups, and each group corresponds to one first pad 17. A test data voltage is sequentially applied to the first pads 17 during the testing of the to-be-tested display panel 600, and accordingly the to-be-tested display panel 600 displays multiple test patterns sequentially. When one of the first pads 17 receives the test data voltage, only the sub-pixels corresponding to the data lines Data connected to the one first pad 17 display a test pattern. A smaller number of sub-pixels emit light in each of the multiple test patterns, so the probability of false detection and missing detection can be greatly reduced during the testing.

In addition, in some embodiments of the present disclosure, at least two first pads 17 adjacent in the first direction x are spaced apart by multiple first electrostatic discharge protection wires 5, so that the distance between adjacent first pads 17 can be reduced by reducing the arrangement width of the first line segments 6 of the first electrostatic discharge protection wires 5 in some embodiments of the present disclosure, thereby reducing an overall space required by all the first pads 17 in the first direction x and optimizing the arrangement of the first pads 17 on the lower bezel.

Figure 29:
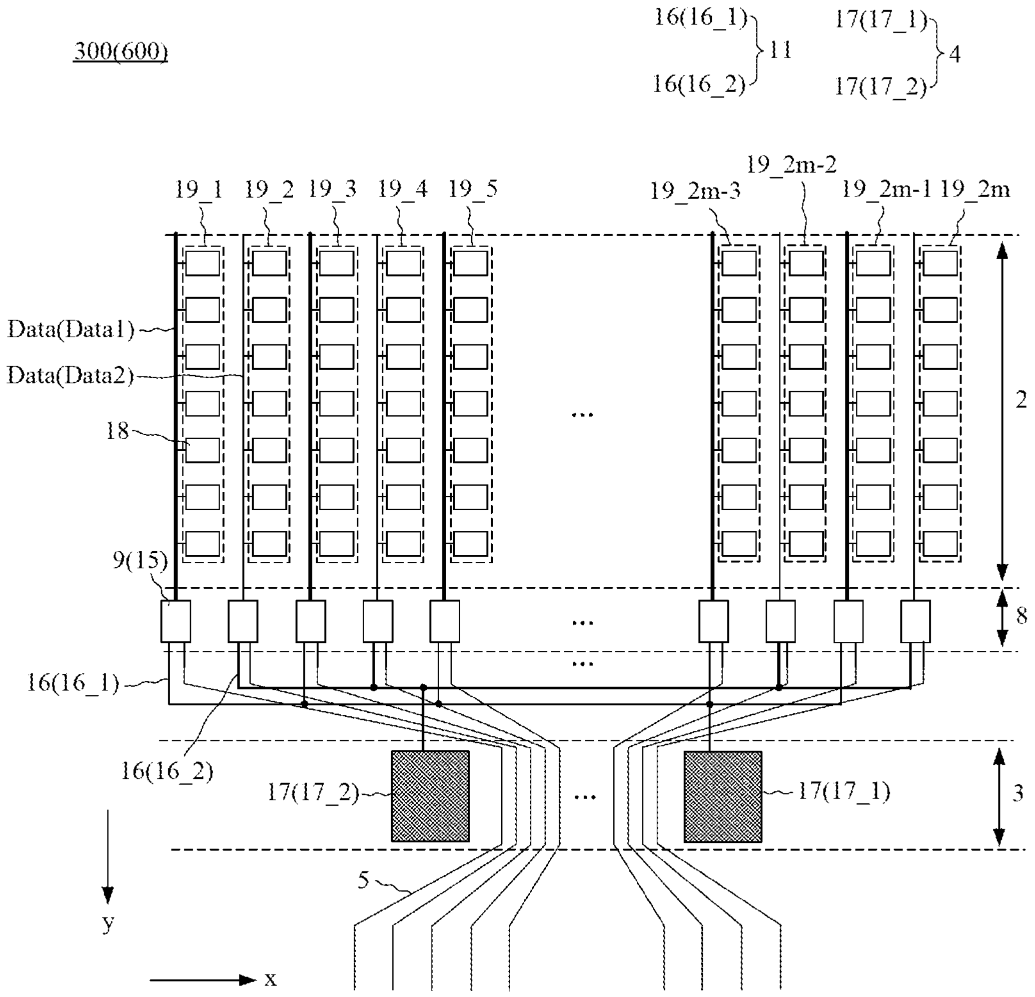
FIG. 29 is a schematic structural diagram of a panel region according to some embodiments of the present disclosure.

FIG. 29 is a schematic structural diagram of a panel region 300 according to some embodiments of the present disclosure. As shown in FIG. 29, one first pad 17 corresponds to multiple data lines Data, and the panel region 300 further includes a plurality of pixel columns 19 arranged along the first direction x in the display region 2. The data lines Data include a first data line Data1 electrically connected to a 2n-1$^{th}$ pixel column 19 and a second data line Data2 electrically connected to a 2n$^{th}$ pixel column 19, where n is a positive integer. The first connection lines 16 include a first-A connection line 16_1 connected to the first data line Data1 and a first-B connection line 16_2 connected to the second data line Data2. The first pads 17 include at least one first-A pad 17_1 and at least one first-B pad 17_2, one first-A pad 17_1 is electrically connected to multiple first-A connection lines 16_1, and one first-B pad 17_2 is electrically connected to multiple first-B connection lines 16_2.

Taking the first-A pad 17_1 as an example, when the test data voltage is applied to the first-A pad 17_1, only the sub-pixels 18 in the odd-numbered pixel columns 19 emit light to form a test pattern. Any two adjacent odd-numbered pixel columns 19 that are emitting light may be spaced by at least one even-numbered pixel column 19 that are not emitting light. Therefore, in each test pattern, each two adjacent pixel columns 19 that are emitting light may be spaced by a certain distance. The sub-pixels 18 that should but fails to emit light can be easily identified.

Figure 30:
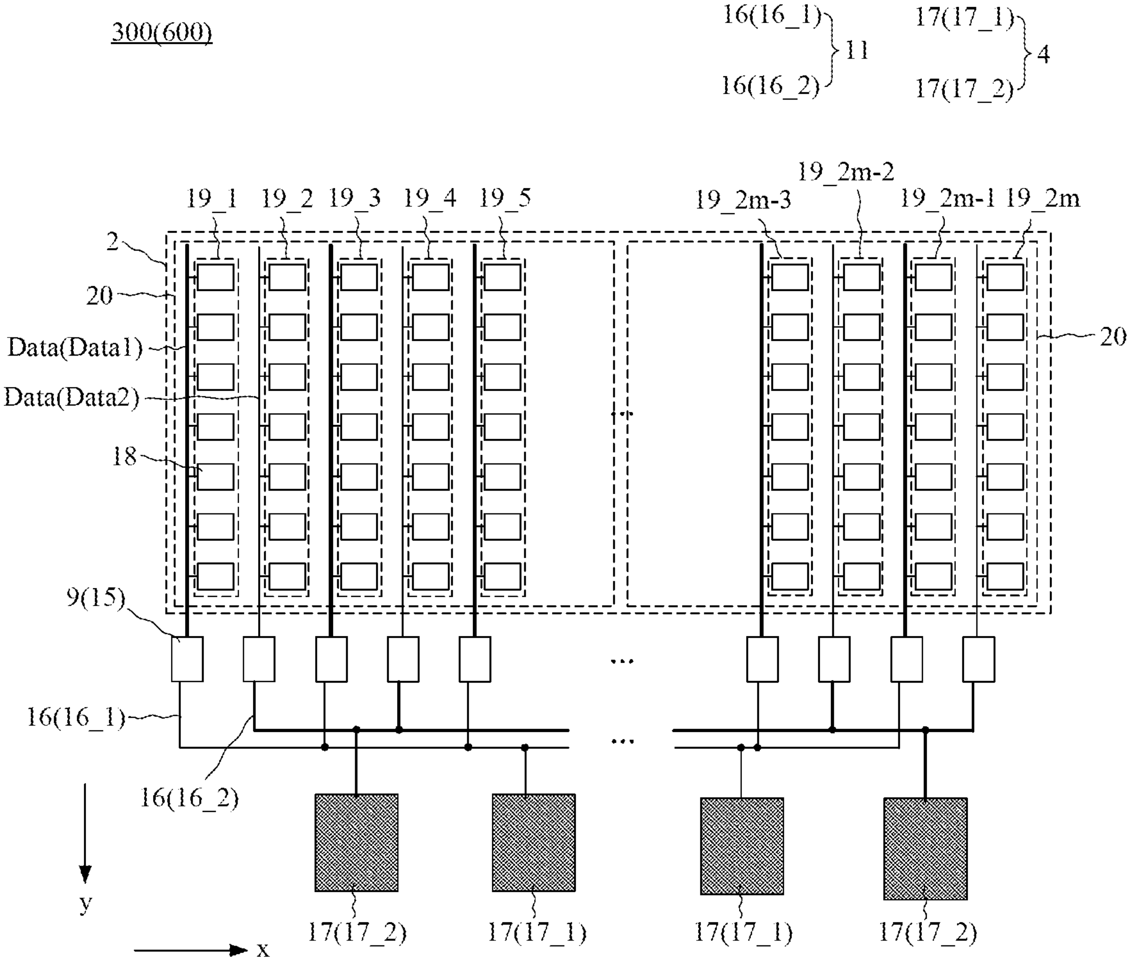
FIG. 30 is another schematic structural diagram of the panel region according to some embodiments of the present disclosure.

In some embodiments, as shown in FIG. 30 which is another schematic structural diagram of the panel region 300, the display region 2 includes at least two sub regions 20 arranged along the first direction x. At least two first-A pads 17_1 are provided, and the at least two first-A pads 17_1 are connected to pixel columns 19 located in at least two different sub regions 20 respectively. In some embodiments, at least two first-B pads 17_2 are provided, and the at least two first-B pads 17_2 are connected to pixel columns 19 located in at least two sub regions 20 respectively.

Still taking the first-A pad 17_1 as an example, in the above arrangement, the odd-numbered pixel columns 19 are further classified into at least two groups, and each group is located in one sub region 20. In this way, during the testing of the to-be-tested display panel 600, when the test data voltage is applied to one of the first-A pads 17_1, only the group of odd-numbered pixel columns 19 in a certain sub region 20 displays a test pattern. As a result, any two pixel columns 19 that are emitting light are spaced by a distance, and the pixel columns 19 that are emitting light are not too sparsely arranged in the entire display area 2, facilitating identification.

Figure 31:
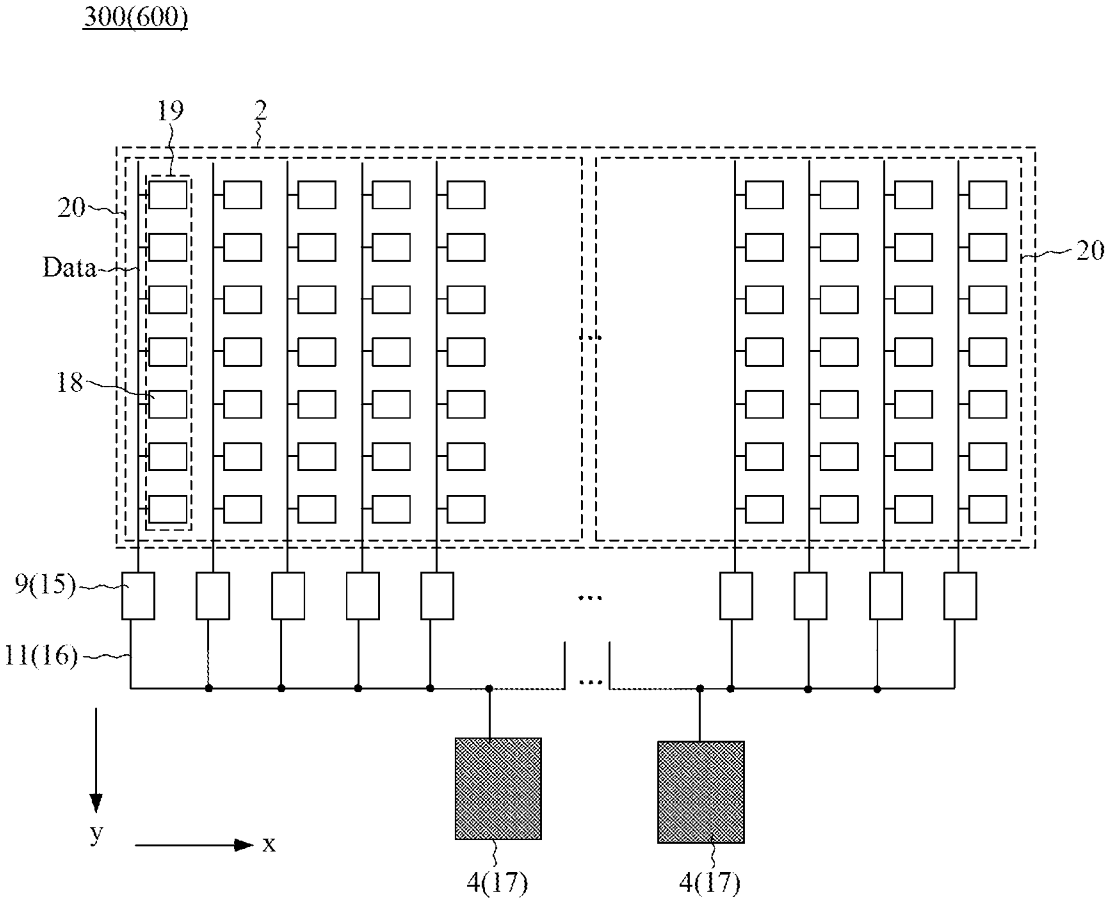
FIG. 31 is yet another schematic structural diagram of the panel region according to some embodiments of the present disclosure.

FIG. 31 is yet another schematic structural diagram of the panel region 300 according to some embodiments of the present disclosure. As shown in FIG. 31, one first pad 17 corresponds to multiple data lines Data, and the display region 300 further includes a plurality of pixel columns 19 arranged along the first direction x in the display region 2. The display region 2 includes at least two sub regions 20 arranged along the first direction x. The pixel columns 19 connected to different ones of the at least two first pads 17 are located in different ones of the at least two sub regions 20 respectively.

In the above arrangement, the data lines Data in each sub region 20 are classified into one group and correspond to one first pad 17. During the testing of the to-be-tested display panel 600, the test data voltage may be sequentially applied to the at least two first pads 17, and the sub-pixels 18 in the at least two sub regions 20 are controlled to sequentially present a test pattern, so that the number of sub-pixels 18 tested in each test pattern is reduced, thereby reducing risks of false detection and missing detection. Moreover, in the arrangement, a smaller number of first pads 17 are required, which can reduce manufacturing difficulty of a test device.

Figure 32:
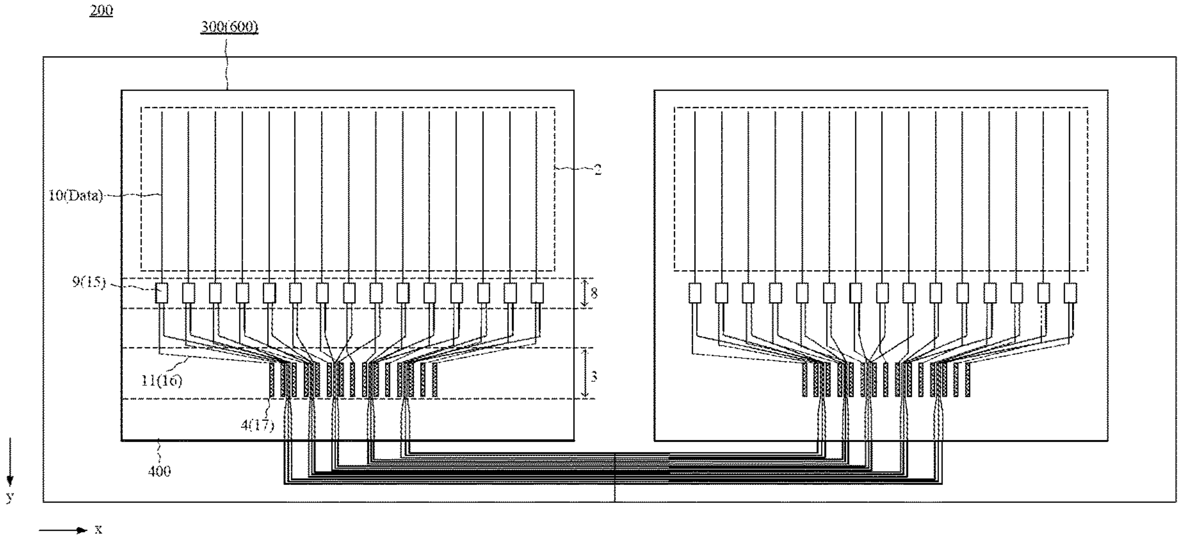
FIG. 32 is still another schematic structural diagram of the motherboard according to some embodiments of the present disclosure.

FIG. 32 is still another schematic structural diagram of the motherboard 200 according to some embodiments of the present disclosure. In one or more feasible embodiments, as shown in FIG. 32, the pins 9 include first pins 15, the driving signal lines 10 include data lines Data located in the display region 2, and the connection lines 11 include first connection lines 16. First ends of the first pins 15 are electrically connected to the data lines Data, and second ends of the first pins 15 are electrically connected to the first connection lines 16.

The test pads 4 include a plurality of first pads 17. The plurality of first pads 17 are electrically connected to a plurality of first connection lines 16 in a one-to-one correspondence manner. At least part of the plurality of first pads 17 are arranged along the first direction x, and at least two first pads 17 adjacent in the first direction x are spaced apart by multiple of the plurality of first electrostatic discharge protection wires 5.

In the above arrangement, during the testing of the to-be-tested display panel 600, the test data voltage may be sequentially applied to the plurality of first pads 17, so that only the pixel column 19 corresponding to one data line Data emits light to present a test pattern at a time. In some embodiments, the test data voltage may be simultaneously applied to several of the plurality of first pads 17, so that the pixel columns 19 corresponding to several data lines Data emit light to present a test pattern at a time. In this way, a very small number of sub-pixels 18 are tested in each test pattern, and the sub-pixels 18 that cannot emit light normally can be easily identified, greatly reducing the probability of false detection or missing detection In addition, in some embodiments of the present disclosure, at least two first pads 17 adjacent in the first direction x are spaced apart by multiple first electrostatic discharge protection wires 5, so that the distance between adjacent first pads 17 can be reduced by reducing the width of the arrangement of the first line segments 6 of the first electrostatic discharge protection wires 5, thereby reducing an overall space required by the first pads 17 in the first direction x and optimizing the arrangement of the first pads 17 on the lower bezel.

Figure 33:
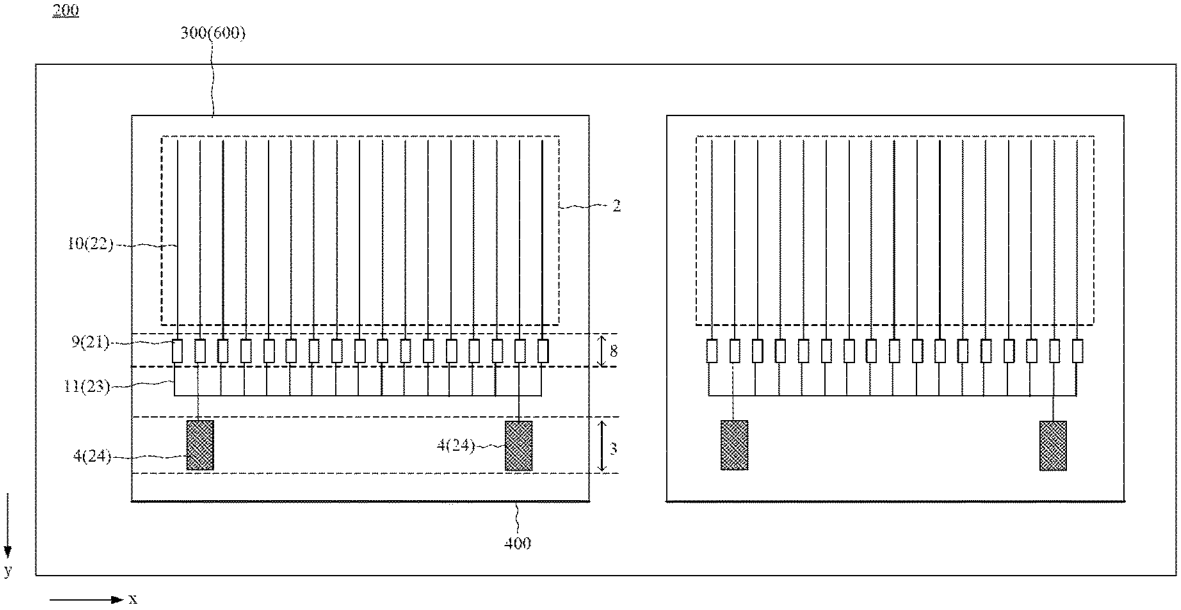
FIG. 33 is a further schematic structural diagram of the motherboard according to some embodiments of the present disclosure.

FIG. 33 is a further schematic structural diagram of the motherboard 200 according to some embodiments of the present disclosure. In one or more feasible embodiments, as shown in FIG. 33, the pins 9 include second pins 21, the driving signal lines 10 include power signal lines 22 located in the display region 2, and the connection lines 11 include second connection lines 23. Each second pin 21 includes a first end electrically connected to one of the power signal lines 22, and a second end electrically connected to one of the second connection lines 23. The pads include second pads 24, and each second pads 24 is electrically connected to all the second connection lines 23.

The manner the power signal lines 22 being connected to the second pads 24 is different from the manner the data lines Data being connected to the first pads 17. The power signal lines 22 are not grouped. All the power signal lines 22 are connected to the second pads 24. During the testing, when a test power voltage is applied to the second pads 24, no matter which part of the pixel columns 19 are driven to display a test pattern at a current moment, the sub-pixels 18 in the pixel columns 19 can receive the test power voltage.

Since there are many kinds of driving signal lines 10 in the display panel 100, if these kinds of driving signal lines 10 adopt a same grouping and testing method, it may be difficult to balance test accuracy and space saving. However, in the arrangement, the number of second pads 24 required by the power signal lines 22 can be reduced, thereby reducing an overall number of the test pads 4 required to be arranged on the lower bezel.

In addition, in one related design, a power bus is arranged in a bezel region, the power signal lines 22 in the display region 2 are extended to the bezel region and connected to the power bus, and then the power bus is connected to the pins 9. However, in order to prevent breakdown of the power bus by static electricity, the power bus may have a large width and occupy a larger bezel space in the lower bezel, thereby leading to a larger width of the lower bezel in the second direction y. In embodiments of the present disclosure, each power signal line 22 is directly extended to the pin 9 and connected to the pin 9, so there is no need to arrange the power bus, reducing the width of the lower bezel in the second direction y.

In some embodiments, referring to FIG. 33 again, the pads include at least two second pads 24. In this way, during the testing, the test power voltage may be simultaneously applied to at least two second pads 24, so that the test power voltage on the at least two second pads 24 is transferred to the power signal lines 22 in the display region 2 at the same time, thereby reducing voltage drop in the test power voltage during the transfer.

Figure 34:
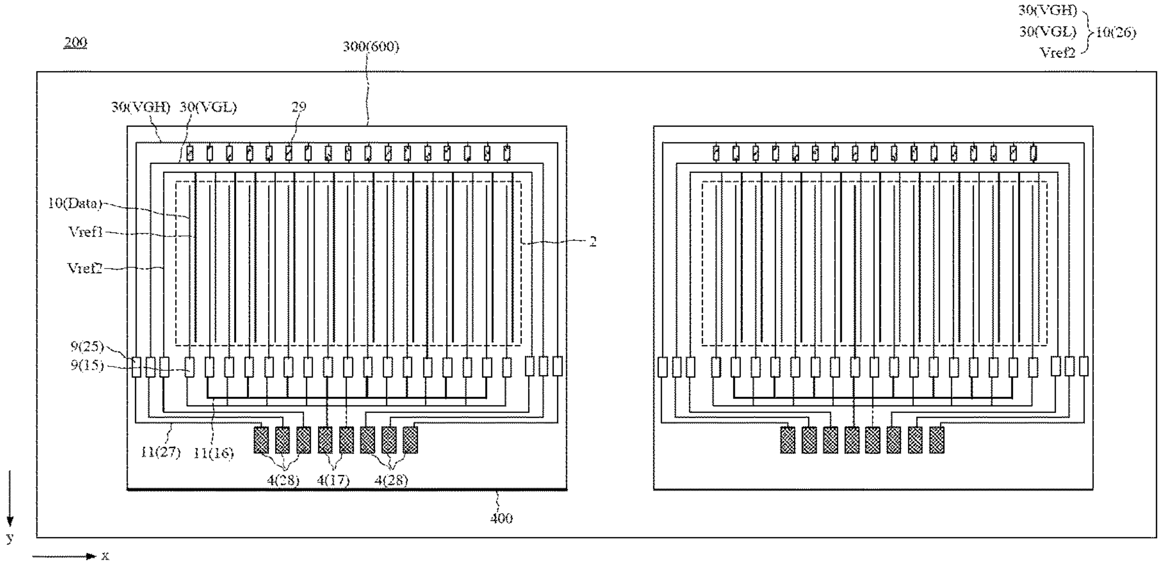
FIG. 34 is a further schematic structural diagram of the motherboard according to some embodiments of the present disclosure.

FIG. 34 is a further schematic structural diagram of the motherboard 200 according to some embodiments of the present disclosure. In some embodiments, as shown in FIG. 34, the pins 9 include third pins 25, the driving signal lines 10 include fixed potential signal lines 26 surrounding the display region 2, and the connection lines 11 include third connection lines 27. First ends of the third pins 25 are electrically connected to constant-voltage signal lines 30, and second ends of the third pins 25 are electrically connected to the third connection lines 27. The test pads 4 include third pads 28, and the third pads 28 are electrically connected to the third connection lines 27.

During the testing of the to-be-tested display panel 600, all kinds of signal lines in the to-be-tested display panel 600 are tested. With reference to the foregoing content, both the data lines Data and the power signal lines 22 may be extended to the pins 9 and connected to the pins 9, and then connected to the test pads 4. In some embodiments of the present disclosure, the fixed potential signal lines 26 are not directly extended down, but extended around the display region 2. The fixed potential signal lines 26 are extended, through a periphery of the display region 2, to the third pins 25 and connected to the third pins 25. In this way, intersections between other connection lines 11 and the third connection lines 27 corresponding to the fixed potential signal lines 26 can be reduced. In this way, the third connection lines 27 corresponding to the fixed potential signal lines 26 can be arranged on a same layer as other connection lines 11, without the need to arrange an additional metal wire layer.

In some embodiments, referring to FIG. 34 again, two ends of the fixed potential signal line 26 are electrically connected to two third pins 25 respectively, and one of the third pins 25 is connected to one of the third pads 28 through one of the third connection lines 27. During the testing of the to-be-tested display panel 600, the test power voltage can be applied to two third pads 28 at the same time, so that a test fixed voltage on the two third pads 28 is transferred from the two ends of the fixed potential signal line 26 to the middle of the fixed potential signal line at the same time, which reduces voltage drop in the test fixed voltage during the transfer.

In some embodiments, referring to FIG. 34 again, in the second direction y, the third pins 25 do not overlap with the display region 2. In this way, the fixed potential signal lines 26 that are connected to the third pins 25 do not intersect connection wires (fan-out lines) connected between the data lines Data and the first pins 15 and connection wires connected between the power signal lines 22 and the second pins 21. These wires may be arranged in a same layer.

In one or more feasible embodiments, referring to FIG. 34 again, the panel region 300 further includes a protection circuit 29, and the fixed potential signal lines 26 include constant-voltage signal lines 30. The constant-voltage signal lines 30 surround the display region 2 and are electrically connected to the protection circuit 29. In one arrangement, the constant-voltage signal lines 30 include a first constant-voltage signal line VGH and a second constant-voltage signal line VGL. The protection circuit 29 may be electrically connected to the data lines Data and configured to protect the data lines Data to prevent the data line Data from static electricity breakdown.

Additionally or alternatively, the panel region 300 further includes first reset signal lines Vref1 extending along the second direction y in the display region 2, and the fixed potential signal lines 26 include a second reset signal line Vref2. The second reset signal line Vref2 surrounds the display region 2 and is connected to ends of the first reset signal lines Vref1 away from the third pads 28. That is, the second reset signal line Vref2 and the first reset signal lines Vref1 are connected at an upper bezel. When a test reset voltage is transferred on the second reset signal line Vref2, the test reset voltage may be quickly transferred to each reset signal line and quickly inputted into the sub-pixels 18 of each pixel column 19.

Figure 35:
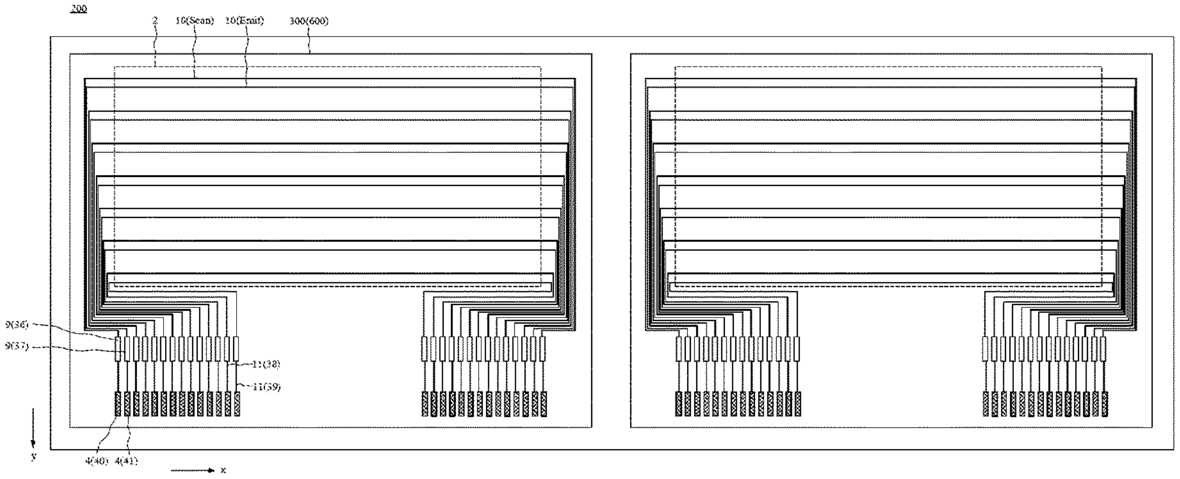
FIG. 35 is a further schematic structural diagram of the motherboard according to some embodiments of the present disclosure.

FIG. 35 is a further schematic structural diagram of the motherboard 200 according to some embodiments of the present disclosure. In one or more feasible embodiments, as shown in FIG. 35, the driving signal lines 10 may further include scanning signal lines Scan extending along the first direction x in the display region 2. Each scanning signal line Scan is electrically connected to the pixel circuit in the sub-pixel 18 and configured to transmit a scanning signal to the pixel circuit to control the pixel circuit to perform a reset operation and a charging operation. The pins 9 further include fourth pins 36, the connection lines 11 further include fourth connection lines 38, and the test pads 4 further include fourth pads 40. One end of each scanning signal line Scan is connected to a first end of one of the fourth pins 36, or two ends of each scanning signal line Scan are connected to first ends of two of the fourth pins 36. Second ends of the fourth pins 36 are connected to the fourth pads 40 through the fourth connection lines 38.

Additionally or alternatively, the driving signal lines 10 further include light emission control signal lines Emit extending along the first direction x in the display region 2. Each light emission control signal line Emit is electrically connected to the pixel circuit in the sub-pixel 18 and configured to transmit a light emission control signal to the pixel circuit to control the pixel circuit to perform a light emission control operation. The pins 9 further include fifth pins 37, the connection lines 11 further include fifth connection lines 39, and the test pads 4 further include fifth pads 41. One end of each light emission control signal line Emit is connected to a first end of one of the fifth pins 37, or two ends of each light emission control signal line Emit are connected to first ends of two of the fifth pins 37. Second ends of the fifth pins 37 are connected to the fifth pads 41 through the fifth connection lines 39.

During the testing of the to-be-tested display panel 600, each fourth pad 40 applies a test scanning voltage to its corresponding scanning signal line Scan separately, and each fifth pad 41 applies a test light emission control voltage to its corresponding light emission control signal line Emit separately.

As described above, the above design is generally applied to a motherboard 200 for forming a mini LED display panel. Since each panel region 300 in the motherboard 200 is provided with a larger number of test pads 4, the configuration of the first electrostatic discharge protection wires 5 according to the embodiments of the present disclosure can bring a better effect.

Figure 36:
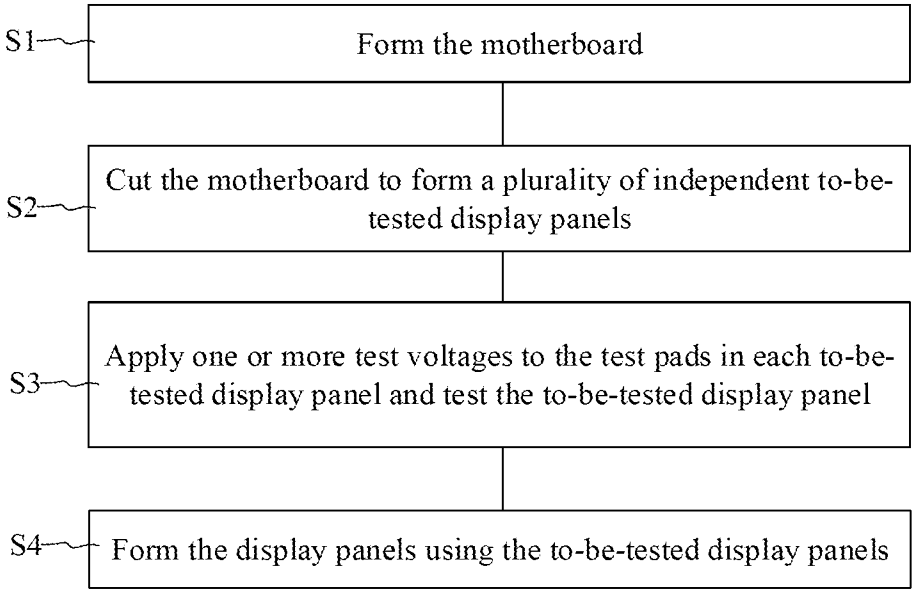
FIG. 36 is a flowchart of a method for manufacturing a display panel according to some embodiments of the present disclosure.
Figure 37A:
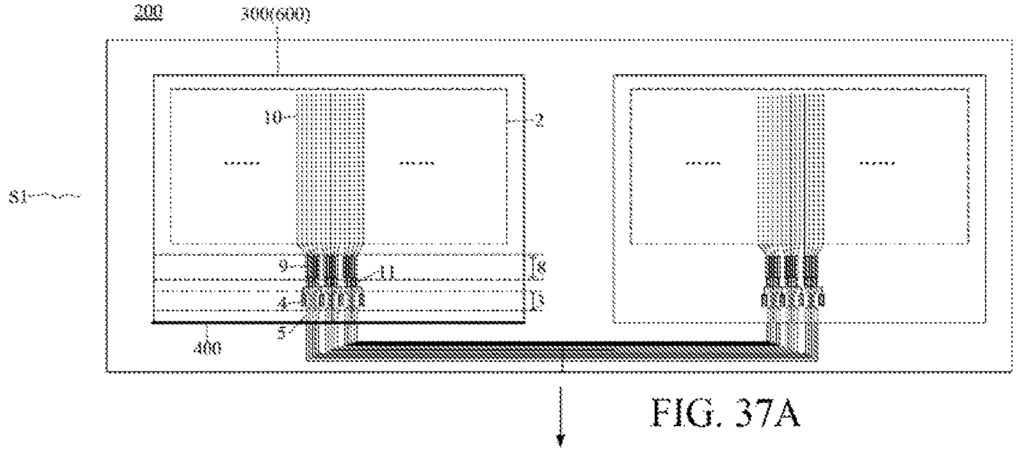
FIGS. 37A-37D are structural flowcharts of the method for manufacturing a display panel according to some embodiments of the present disclosure.
Figure 37B:
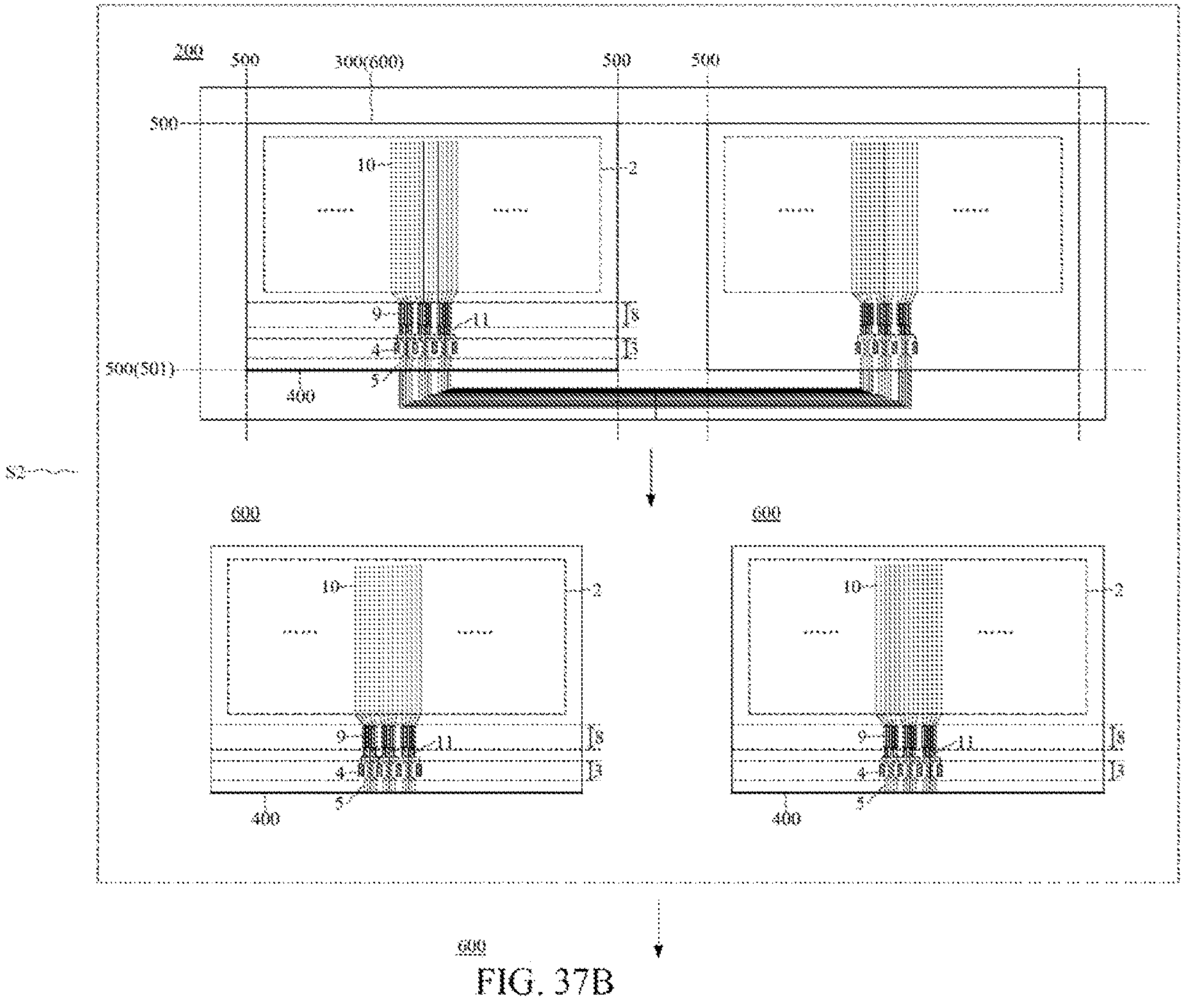
Figure 37C:
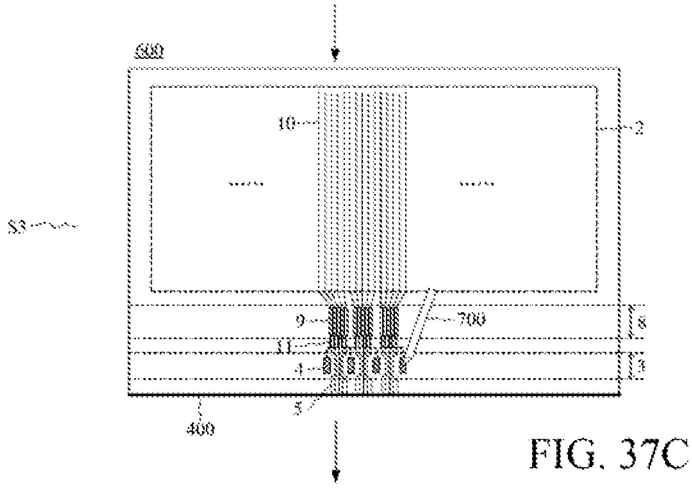
Figure 37D:
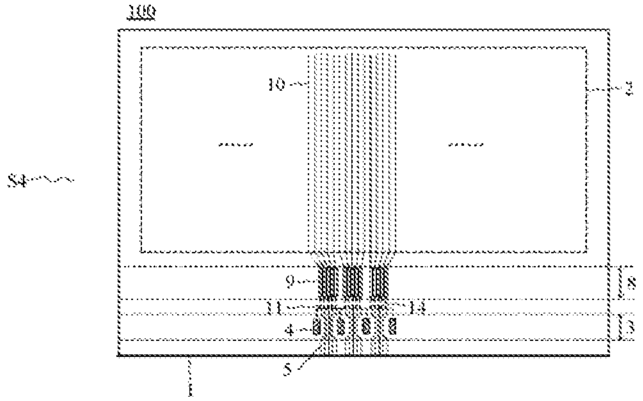

Based on a same inventive concept, some embodiments of the present disclosure further provide a method for manufacturing a display panel 100. FIG. 36 is a flowchart of a method for manufacturing a display panel 100 according to some embodiments of the present disclosure. As shown in FIG. 36, the manufacturing method includes the following steps.

In step S1, the motherboard 200 is formed.

In step S2, the motherboard 200 is cut to form a plurality of independent to-be-tested display panels 600.

In step S3, a test voltage is applied to the test pads 4 in each to-be-tested display panel 600 to test the to-be-tested display panel 600.

In step S4, the display panel 100 is formed using the to-be-tested display panel 600.

Based on the above analysis of the display panel 100 and the motherboard 200, when the test voltages are applied by a probe to the test pads 4 in the display panel 100 formed with the above manufacturing method, a risk of scratching the first line segments 6 by the probe can be reduced, and short circuit between the test pads 4 and the first line segments 6 and short circuit between two adjacent first line segments 6 can be prevented, thereby preventing false detection during the testing of the to-be-tested display panels 600. In addition, when each panel region 300 is provided with a larger number of test pads 4, the arrangement of these test pads 4 on the lower bezel can also be optimized based on the narrowing design of the arrangement of the first line segments 6.

It is to be noted that, when the display panel is a mini LED display panel, after the motherboard 200 is cut to form the plurality of independent to-be-tested display panels 600, a transfer process (such as surface mounting) is further performed to place mini LEDs on the to-be-tested display panels 600, and then the to-be-tested display panels 600 are tested.

In one or more feasible embodiments, referring to FIG. 28 and FIG. 29, the panel region 300 further includes a bonding region 8 between the display region 2 and the test region 3, and the bonding region 8 includes a plurality of pins 9. At least one of the plurality of pins 9 each includes a first end electrically connected to the driving signal line 10, and a second end electrically connected to the test pad 4 through the connection line 11.

The pins 9 include first pins 15, the driving signal lines 10 include data lines Data located in the display region 2, and the connection lines 11 include first connection lines 16. First ends of the first pins 15 are electrically connected to the data lines Data, and second ends of the first pins 15 are electrically connected to the first connection lines 16. The test pads 4 include at least two first pads 17, each one of which is electrically connected to multiple first connection lines 16. Different first pads 17 are connected to different data lines Data. At least part of the at least two first pads 17 are arranged along the first direction x. At least two first pads 17 adjacent in the first direction x are spaced apart by multiple first electrostatic discharge protection wires 5.

Based on the above structure, the process of applying a test voltage to the test pads 4 in each to-be-tested display panel 600 includes: applying the test voltage to at least two first pads 17 sequentially in each to-be-tested display panel 600, to cause the to-be-tested display panel 600 to sequentially display a plurality of test patterns. When one of the at least two first pads 17 receives the test data voltage, only the sub-pixels 18 corresponding to the data lines Data connected to the one first pad 17 display a test pattern. The number of sub-pixels 18 emit light in the test pattern is reduced, so the probability of false detection and missing detection can be greatly reduced during the testing.

In one or more feasible embodiments, referring to FIG. 3 to FIG. 5, FIG. 22, and FIG. 23, the panel region 300 further includes a bonding region 8 between the display region 2 and the test region 3, the bonding region 8 includes a plurality of pins 9, first ends of the plurality of pins 9 are electrically connected to driving signal lines 10, and second ends of at least part of the plurality of pins 9 are electrically connected to the test pads 4 through connection lines 11.

FIGS. 37A-37D are structural flowcharts of the method for manufacturing a display panel according to some embodiments of the present disclosure. As shown in FIGS. 37A-37D, step S2 may include: cutting the motherboard 200 along cutting lines 500 to form the plurality of to-be-tested display panels 600, where the cutting lines 500 include a first cutting line 501, and the first cutting line 501 coincides with the first edge 400.

For example, step S4 may include cutting off, by laser, the connection lines 11 in each to-be-tested display panel 600 to form a fracture 14 in each of the connection lines 11, so as to form the display panel.

That is, the step the test pads 4 are kept in the display panel 100 is obtained with the above manufacturing method. After the testing of the to-be-tested display panel 600, the connection lines 11 between the test pads 4 and the pins 9 are cut by laser, which can disconnect the test pads 4 from the pins 9. After the display panel 100 is put into use, reliability of display can be improved. Moreover, since the connection lines 11 are cut off by laser, a risk of static electricity is reduced, less or no metal particle is generated by cutting, and short circuit between adjacent wires caused by the metal particle generated by cutting is prevented.

In step S3 in FIGS. 37A-37D and FIGS. 38A-38C, the probe is denoted by a reference sign 700.

In one or more feasible embodiments, referring to FIG. 24 to FIG. 26, the panel region 300 further includes a bonding region 8 between the display region 2 and the test region 3, the bonding region 8 includes a plurality of pins 9, first ends of the plurality of pins 9 are electrically connected to driving signal lines 10, and second ends of at least part of the plurality of pins 9 are electrically connected to the test pads 4 through connection lines 11.

FIGS. 38A-38C are structural flowcharts of the method for manufacturing a display panel according to some embodiments of the present disclosure. As shown in FIGS. 38A-38C, step S2 may include: cutting the motherboard 200 along cutting lines 500 to form the plurality of to-be-tested display panels 600, where the cutting lines 500 include a first cutting line 501, and the first cutting line 501 coincides with the first edge 400.

For example, S4 may include cutting the to-be-tested display panel 600 along a second cutting line 502 to form the display panel 100, where the second cutting line 502 is located between the pins 9 and the test pads 4.

That is, the step where the test pads 4 are located is not kept in the display panel 100 obtained with the above manufacturing method. After the testing of the to-be-tested display panel 600, the step where the test pads 4 are located is removed by cutting directly along the second cutting line 502. In this way, the display panel 100 finally formed may have a narrow lower bezel, which optimizes the design of the narrow bezel of the display panel 100.

Based on a similar inventive concept, some embodiments of the present disclosure provide a display panel 100. The display panel 100 is manufactured with the above method for manufacturing a display panel 100. The display panel 100 formed by the above manufacturing method may be either the panel structure with the test pads 4 shown in FIG. 3 or the panel structure without the test pads 4 shown in FIG. 26.

Figure 39:
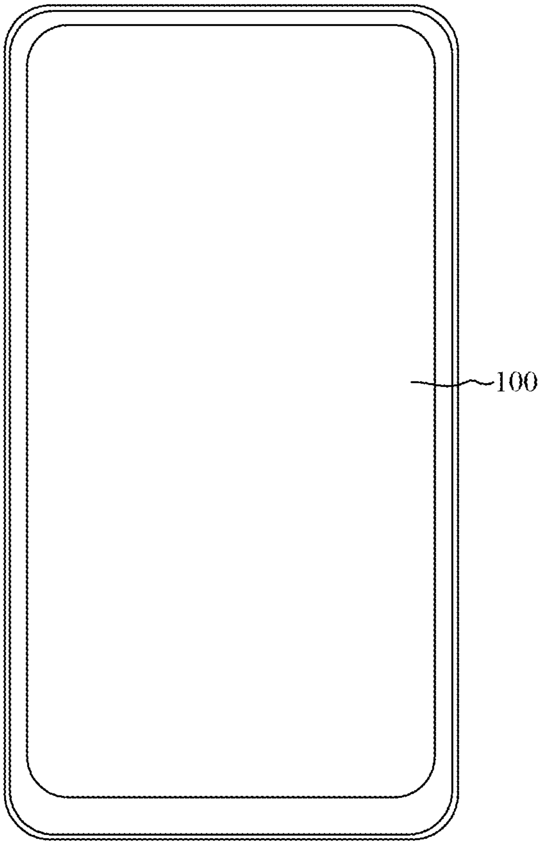
FIG. 39 is a schematic structural diagram of a mini LED display device according to some embodiments of the present disclosure.

Based on a same invention concept, some embodiments of the present disclosure further provide a mini LED display device. FIG. 39 is a schematic structural diagram of a mini LED display device according to some embodiments of the present disclosure. As shown in FIG. 39, the display device includes the above display panel 100. The specific structure of the display panel 100 has been described in detail in the above embodiments. Details are not described herein again. It is to be noted that the display panel 100 may be either the panel structure with the test pads 4 shown in FIG. 3 or the panel structure without the test pads 4 shown in FIG. 26.

Certainly, the display device shown in FIG. 39 is only a schematic illustration, and the display device may be any electronic device with a display function such as a mobile phone, a tablet computer, a notebook computer, an e-book, or a television.

It is to be noted that the number of test pads 4 in the display panel in the mini LED display device may generally be much greater than the number of test pads 4 in a display panel of a liquid crystal display device or an organic light-emitting diode display device. In the display panels of the liquid crystal display device and the organic light-emitting diode display device, the scanning signal lines Scan and the light emission control signal lines Emit are generally electrically connected to a shift register and driven by signal lines such as clock signal lines and frame start signal lines. The shift register sequentially outputs a scanning signal to the scanning signal lines Scan or sequentially outputs a light emission control signal to the light emission control signal lines Emit. For the display panels of the liquid crystal display device and the organic light-emitting diode display device, it just needs to arrange test pads 4 for providing test voltages to the signal lines such as the clock signal lines and the frame start signal lines. Accordingly, the shift register can be driven to output signals during the testing. However, in the display panel of the mini LED display device, referring to FIG. 18 and FIG. 35, each scanning signal line Scan corresponds to one or two fourth pads 40, and each light emission control signal line Emit also corresponds to one or two fifth pads 41. As a result, a large number of test pads 4 are required in such display panels. For the mini LED display device with a larger number of test pads 4, the application of the design of the first electrostatic discharge protection wires 5 according to the embodiments of the present disclosure can bring a more significant effect.

The above are only preferred embodiments of the present disclosure and are not intended to limit the present disclosure. Any modifications, equivalent replacements, improvements, and the like made within the spirit and the principle of the present disclosure are intended to be included within the protection scope of the present disclosure.

Finally, it should be noted that the above embodiments are merely intended to describe the technical solutions of the present disclosure instead of limiting the present disclosure. Although the present disclosure is described in detail with reference to the above embodiments, those of ordinary skill in the art should understand that they can still make modifications to the technical solutions described in the above embodiments, or make equivalent replacements to some or all of the technical features in the technical solutions; and these modifications or replacements do not make the essence of corresponding technical solutions depart from the scope of the technical solutions of the embodiments of the present disclosure.

What is claimed is:

1. A display panel, comprising:

a panel edge extending along a first direction;

a display region and a test region arranged along a second direction intersecting the first direction; and a plurality of first electrostatic discharge protection wires extending from one side of the display region adjacent to the test region to the panel edge, wherein the test region is located between the display region and the panel edge and comprises a plurality of test pads, at least two test pads of the plurality of test pads being arranged along the first direction, and adjacent test pads of the at least two test pads in the first direction are spaced apart by at least two first electrostatic discharge protection wires of the plurality of first electrostatic discharge protection wires, and wherein each of the plurality of first electrostatic discharge protection wires comprises a first line segment and a second line segment, the first line segment located between two adjacent test pads, and the second line segment adjacent to the panel edge, and wherein a distance between adjacent first line segments that are located between two adjacent test pads in the first direction is less than a distance between adjacent second line segments in the first direction.

2. The display panel according to claim 1, wherein a distance between a test pad of the plurality of test pads and a first line segment of a first electrostatic discharge protection wire of the plurality of first electrostatic discharge protection wires adjacent to the test pad in the first direction is greater than the distance between adjacent first line segments located between two adjacent test pads in the first direction.

3. The display panel according to claim 1, further comprising:

a bonding region located between the display region and the test region;

a plurality of driving signal lines; and a plurality of connection lines each comprising a first end and a second end, the second end connected to one of the plurality of test pads, wherein the bonding region comprises a plurality of pins wherein each pin of the plurality of pins comprises: a first end connected to a driving signal line of the plurality of driving signal lines, and a second end connected to the first end of one of the plurality of connection lines, and wherein each connection line of the plurality of connection lines comprises a fracture between the first end and the second end, wherein each connection line of the plurality of connection lines is disconnected at the fracture.

4. The display panel according to claim 3, wherein the second end of at least one pin of the plurality of pins is connected to one of the plurality of first electrostatic discharge protection wires.

5. The display panel according to claim 3, wherein the plurality of pins comprise a plurality of first pins, the plurality of driving signal lines comprise a plurality of data lines located in the display region, the plurality of connection lines comprise a plurality of first connection lines, wherein first ends of the plurality of first pins are connected to the plurality of data lines, and second ends of the plurality of first pins are connected to first ends of the plurality of first connection lines, and the plurality of test pads comprise a plurality of first pads, each one of the plurality of first pads being connected to second ends of first connection lines of the plurality of first connection lines, and first connection lines connected to different first pads correspond to different data lines, wherein at least two first pads of the plurality of first pads are arranged along the first direction, adjacent ones of the at least two first pads are spaced apart by at least two of the plurality of first electrostatic discharge protection wires.

6. The display panel according to claim 5, further comprising a plurality of pixel columns arranged along the first direction in the display region, wherein the plurality of data lines comprising first data lines are connected to odd-numbered pixel columns of the plurality of pixel columns and second data lines are connected to even-numbered pixel columns of the plurality of pixel columns, wherein the plurality of first connection lines comprise first-A connection lines and first-B connection lines, first ends of the first-A connection lines being connected to the first data lines respectively, and first ends of the first-B connection lines being connected to the second data lines respectively, and wherein the plurality of first pads comprises at least one first-A pad and at least one first-B pad, each first-A pad being connected to at least two of the first-A connection lines, and each first-B pad being connected to at least two of the first-B connection lines.

7. The display panel according to claim 6, wherein the display region comprises sub regions arranged along the first direction, wherein the at least one first-A pad comprises at least two first-A pads, wherein the first-A connection lines connected to the at least two first-A pads corresponding to pixel columns are located in at least two different sub regions respectively, and/or the at least one first-B pad comprises at least two first-B pads, wherein the first-B connection lines connected to the at least two first-B pads corresponding to pixel columns are located in at least two different sub regions respectively.

8. The display panel according to claim 5, further comprising a plurality of pixel columns arranged along the first direction in the display region, and the display region comprising sub regions arranged along the first direction, wherein first connection lines connected to different first pads correspond to pixel columns located in different sub regions.

9. The display panel according to claim 3, wherein the plurality of pins comprise a plurality of first pins, the plurality of driving signal lines comprise a plurality of data lines located in the display region, and the plurality of connection lines comprise a plurality of first connection lines, wherein first ends of the plurality of first pins are connected to the plurality of data lines, and second ends of the plurality of first pins are connected to first ends of the plurality of first connection lines, wherein the plurality of test pads comprises a plurality of first pads, the plurality of first pads being in one-to-one correspondence with the plurality of first connection lines and connected to the second ends of the plurality of first connection lines respectively, and wherein at least two first pads of the plurality of first pads are arranged along the first direction, and adjacent two first pads of the at least two first pads in the first direction are spaced apart by first electrostatic discharge protection wires of the plurality of first electrostatic discharge protection wires.

10. The display panel according to claim 3, wherein the plurality of pins comprise a plurality of second pins, the plurality of driving signal lines comprise a plurality of power signal lines located in the display region, and the plurality of connection lines comprise a plurality of second connection lines, wherein each of the plurality of second pins comprises a first end connected to one of the plurality of power signal lines and a second end connected to the first end of one of the second connection lines, and wherein the plurality of pads comprises a second pad that is connected to the second ends of the plurality of second connection lines.

11. The display panel according to claim 10, wherein the plurality of second pins comprise second-A pins, the plurality of power signal lines comprise positive power signal lines, and the plurality of second connection lines comprise second-A connection lines, wherein each of the second-A pins comprises a first end electrically connected to one positive power signal line of the positive power signal lines and a second end electrically connected to the first end of one second-A connection line of the second-A connection lines, and the second pad comprises a second-A pad that is connected to the second ends of all of the second-A connection lines;

and/or wherein the plurality of second pins comprise second-B pins, the plurality of power signal lines comprise negative power signal lines, and the plurality of second connection lines comprise second-B connection lines, wherein each of the second-B pins comprises a first end electrically connected to one negative power signal line of the negative power signal lines and a second end electrically connected to the first end of one second-B connection line of the second-B connection lines, and the second pad comprises a second-B pad that is connected to the second ends of all of the second-B connection lines.

12. The display panel according to claim 3, wherein the plurality of pins comprise a plurality of third pins, the plurality of driving signal lines comprise a plurality of fixed potential signal lines surrounding the display region, and the plurality of connection lines comprise a plurality of third connection lines, wherein first ends of the plurality of third pins are connected to the plurality of fixed potential signal lines, second ends of the plurality of third pins are connected to the first ends of the plurality of third connection lines, and wherein the plurality of test pads comprise third pads connected to the second ends of the plurality of third connection lines.

13. The display panel according to claim 12, wherein two ends of each fixed potential signal line are electrically connected to two third pins of the plurality of third pins respectively, and each of the plurality of third pins is connected to one third pad of the plurality of third pads through one of the plurality of third connection lines.

14. The display panel according to claim 12, wherein the display panel further comprises a protection circuit, and the plurality of fixed potential signal lines comprise constant-voltage signal lines surrounding the display region, wherein the constant-voltage signal lines are connected to the protection circuit, and/or wherein the display panel further comprises first reset signal lines extending along the second direction in the display region, and the plurality of fixed potential signal lines comprise a second reset signal line surrounding the display region, wherein the second reset signal line is connected to ends of the first reset signal lines away from the plurality of third pads.

15. The display panel according to claim 1, wherein the plurality of test pads is further connected to second electrostatic discharge protection wires, and the second electrostatic discharge protection wires at least extend to the panel edge.

16. The display panel according to claim 1, wherein the plurality of test pads defines at least two pad groups arranged along the second direction, and each pad group of the at least two pad groups comprises test pads of the plurality of test pads arranged along the first direction, and every adjacent two first line segments of the first line segments between adjacent test pads in each pad group have a distance less than a distance between adjacent second line segments.

17. The display panel according to claim 1, wherein the plurality of test pads comprises a pad group, the pad group comprises at least two pad units arranged along the first direction, and each pad unit comprises at least two pads of the plurality of test pads arranged along the first direction, and wherein no first electrostatic discharge protection wire is arranged between two adjacent test pads in each pad unit, two adjacent pad units of the at least two pad units are spaced apart by a first electrostatic discharge protection wire of the plurality of first electrostatic discharge protection wires, and a distance between the first line segments between every adjacent pad unit is less than a distance between adjacent second line segments.

18. The display panel according to claim 3, wherein the plurality of pins comprise a plurality of fourth pins, the plurality of driving signal lines comprise a plurality of scanning signal lines extending along the first direction, the plurality of connection lines comprise a plurality of fourth connection lines, and the plurality of pads comprise a plurality of fourth pads, wherein one end of each scanning signal line is connected to a first end of one fourth pin of the plurality of fourth pins, or two ends of each scanning signal line are connected to first ends of two fourth pins of the plurality of fourth pins, second ends of the plurality of fourth pins are connected to first ends of the plurality of fourth connection lines, and second ends of the plurality of fourth connection lines are connected to the plurality of fourth pads, and/or wherein the plurality of pins further comprise a plurality of fifth pins, the plurality of driving signal lines comprise a plurality of light emission control signal lines extending along the first direction, the plurality of connection lines comprise a plurality of fifth connection lines, and the plurality of pads comprise a plurality of fifth pads, wherein end of each light emission control signal is connected to a first end of one fifth pin of the plurality of fifth pins, or two ends of each light emission control signal are connected to first ends of two fifth pins of the plurality of fifth pins, wherein second ends of the plurality of fifth pins are connected to first ends of the plurality of fifth connection lines, and second ends of the plurality of fifth connection lines are connected to the plurality of fifth pads.

19. A motherboard comprising a plurality of panel regions, each panel region corresponding to a to-be-tested display panel, each panel region comprising:

a first edge extending along a first direction;

a display region and a test region arranged along a second direction intersecting the first direction; and a plurality of first electrostatic discharge protection wires extending from one side of the display region adjacent to the test region to the first edge, wherein the test region is located between the display region and the first edge and comprises a plurality of test pads, at least two test pads of the plurality of test pads being arranged along the first direction, and adjacent test pads of the at least two test pads in the first direction are spaced apart by at least two first electrostatic discharge protection wires of the plurality of first electrostatic discharge protection wires, wherein each of the plurality of first electrostatic discharge protection wires comprises a first line segment and a second line segment, the first line segment located between two adjacent test pads, and the second line segment connected to the first line segment, and wherein a distance between adjacent first line segments that are located between two adjacent test pads in the first direction is less than a distance between adjacent second line segments in the first direction.

20. A mini LED display device, comprising a display panel, wherein the display panel comprises:

a panel edge extending along a first direction;

a display region and a test region arranged along a second direction intersecting the first direction; and a plurality of first electrostatic discharge protection wires extending from one side of the display region adjacent to the test region to the panel edge, wherein the test region is located between the display region and the panel edge and comprises a plurality of test pads, at least two test pads of the plurality of test pads being arranged along the first direction, and adjacent test pads of the at least two test pads in the first direction are spaced apart by at least two first electrostatic discharge protection wires of the plurality of first electrostatic discharge protection wires, and wherein each of the plurality of first electrostatic discharge protection wires comprises a first line segment and a second line segment, the first line segment located between two adjacent test pads, and the second line segment is adjacent to the panel edge, and wherein a distance between adjacent first line segments located between two adjacent test pads in the first direction is less than a distance between adjacent second line segments in the first direction.

* * * * *